(12) United States Patent
Chen et al.

(10) Patent No.: US 6,400,116 B1
(45) Date of Patent: *Jun. 4, 2002

(54) MOTOR DRIVE CONTROL APPARATUS

(75) Inventors: Hui Chen; Kouji Matsuda, both of Gumma (JP)

(73) Assignee: NSK Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,394

(22) PCT Filed: Jun. 7, 1999

(86) PCT No.: PCT/JP99/03021

§ 371 (c)(1),
(2), (4) Date: Feb. 9, 2000

(87) PCT Pub. No.: WO99/65138

PCT Pub. Date: Dec. 16, 1999

(30) Foreign Application Priority Data

Jun. 9, 1998 (JP) .......................... 10-160641
Mar. 12, 1999 (JP) .......................... 11-066806
Apr. 22, 1999 (JP) .......................... 11-115098

(51) Int. Cl.[7] ............................ G05B 11/28
(52) U.S. Cl. .................. 318/599; 318/138; 318/139; 318/245; 318/254; 318/439; 318/700; 318/800; 318/805; 318/811
(58) Field of Search .................. 318/599, 138, 318/245, 254, 439, 800, 811, 700, 139

(56) References Cited

U.S. PATENT DOCUMENTS 4,544,868 A * 10/1985 Murty .................. 318/254
4,912,379 A * 3/1990 Matsuda et al. .......... 318/254
4,950,968 A * 8/1990 Ogura .................. 318/599
5,444,341 A   8/1995 Kneifel, et al.
5,627,441 A * 5/1997 Sakurai et al. .......... 318/599
5,744,921 A * 4/1998 Makaran .............. 318/254
5,923,728 A * 7/1999 Ikkai et al. ............ 378/807

FOREIGN PATENT DOCUMENTS

| DE | 39 40 569 A1 | 6/1991 | |
| EP | 0 635 929 A1 | 1/1994 | |
| EP | 0 769 843 A1 | 4/1997 | |
| JP | 1-103191 | 4/1989 | H02P/6/02 |
| JP | 5-115195 | 5/1993 | H02P/6/02 |

OTHER PUBLICATIONS

International Search Report (foreign language).

German Patent and Trademark Office, Office Action, dated Dec. 6, 2001.

* cited by examiner

Primary Examiner—Robert E. Nappi
Assistant Examiner—Tyrone Smith
(74) Attorney, Agent, or Firm—Sughrue Mion, PLLC

(57) ABSTRACT

A motor drive control system suitable for control of a drive of a motor, such as a brushless motor or a linear motor, having a plurality of excitation phases, through the use of rectangular waves. A drive means is provided for producing an excitation signal to be supplied to each of the excitation phases of the motor and a control means for determining a direction of the excitation signal for each of the excitation phases and for conducting ON/OFF switching. The control means controls the rate of change of the excitation signal to be switched at the switching operation.

11 Claims, 27 Drawing Sheets

RAPID LEVEL VARIATION TORQUE WAVEFORM DUE TO OFF-PHASE RESIDUAL CURRENT

FIG. 10
(A) COUNTER ELECTROMOTIVE VOLTAGE (ANGLE SPEED ω)
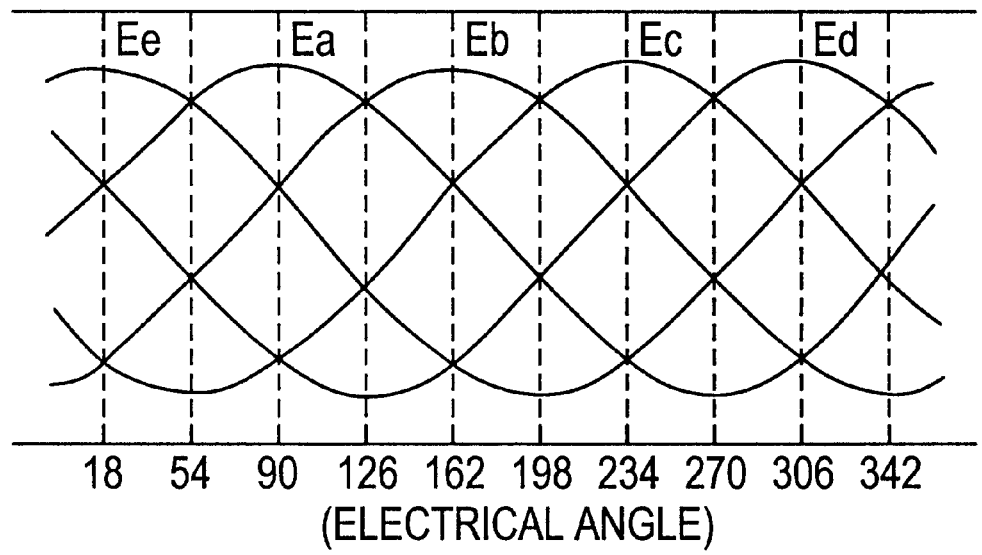
(ELECTRICAL ANGLE)
(B) G'pc (→ Duty 2)
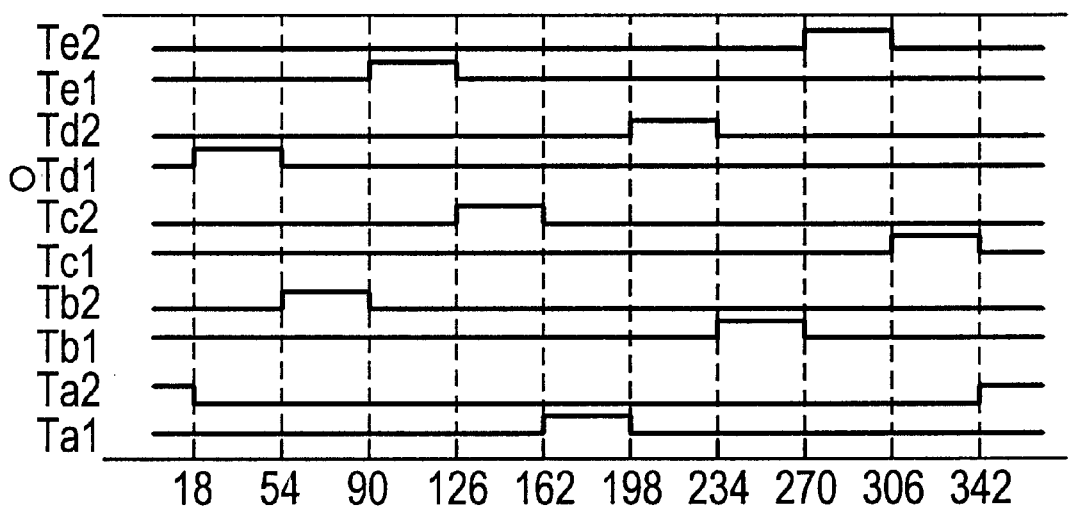

FIG. 11
(C) G" 1-10 (⟶ Duty 1)
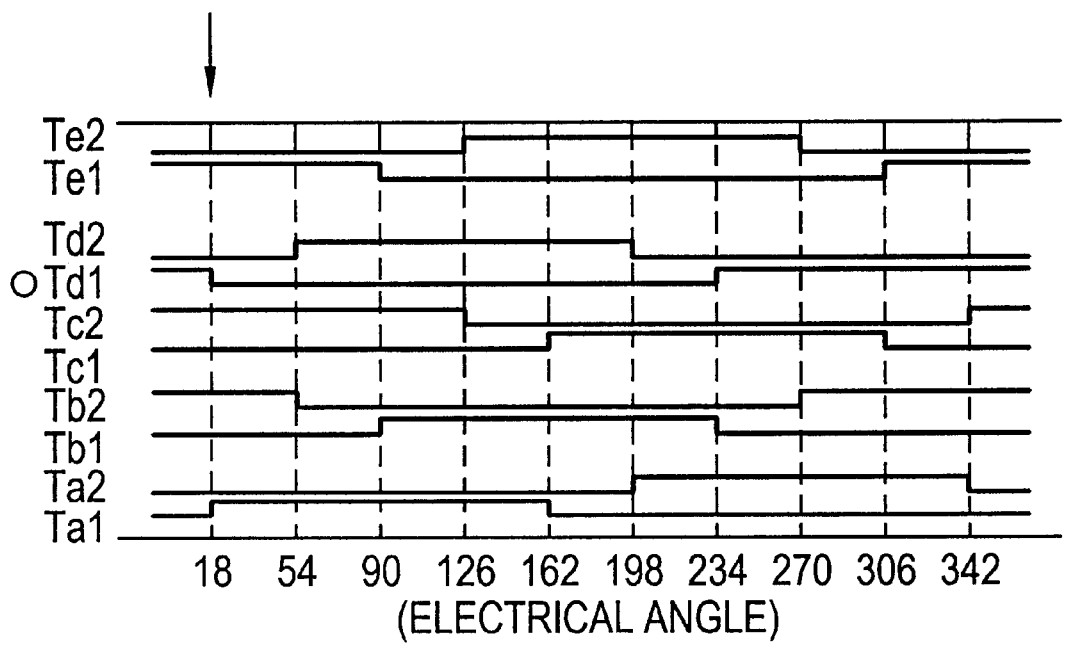
(ELECTRICAL ANGLE)
(D) ROTOR POSITION
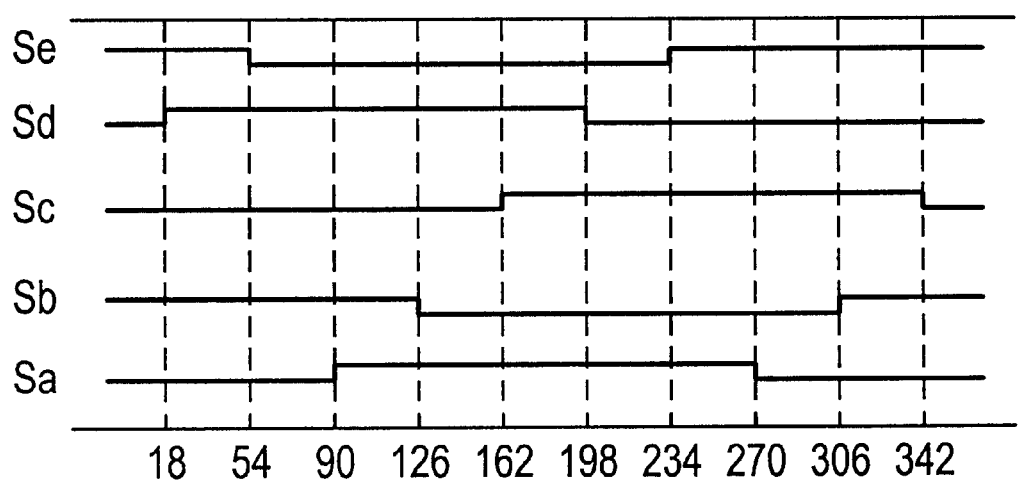

FIG. 13
(A) COUNTER ELECTROMOTIVE VOLTAGE
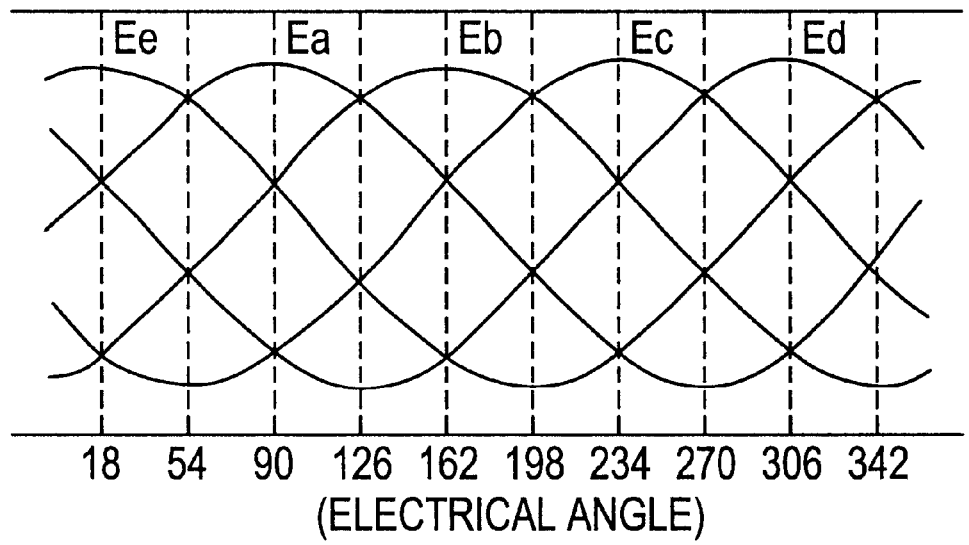
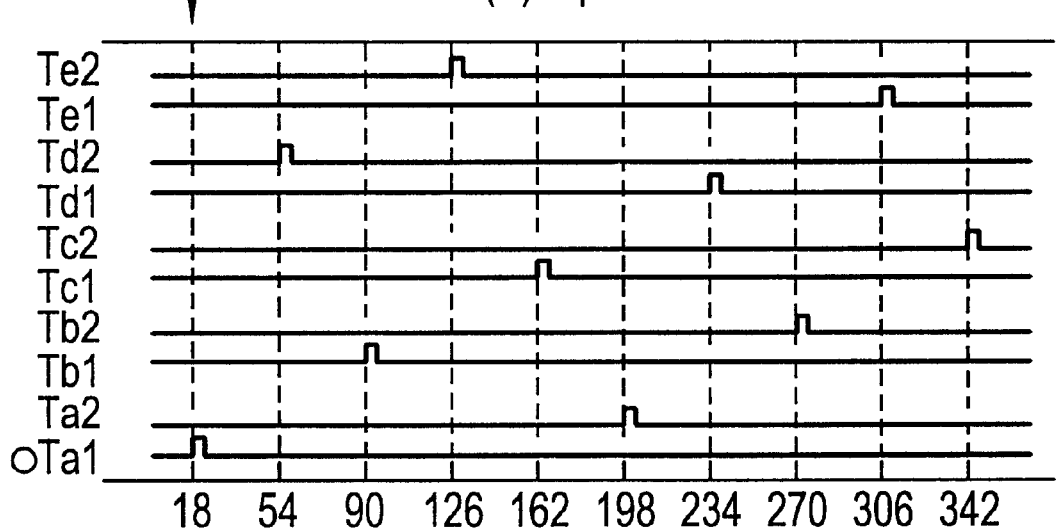

FIG. 14
(C) G" 1-10 (→ Duty 1)
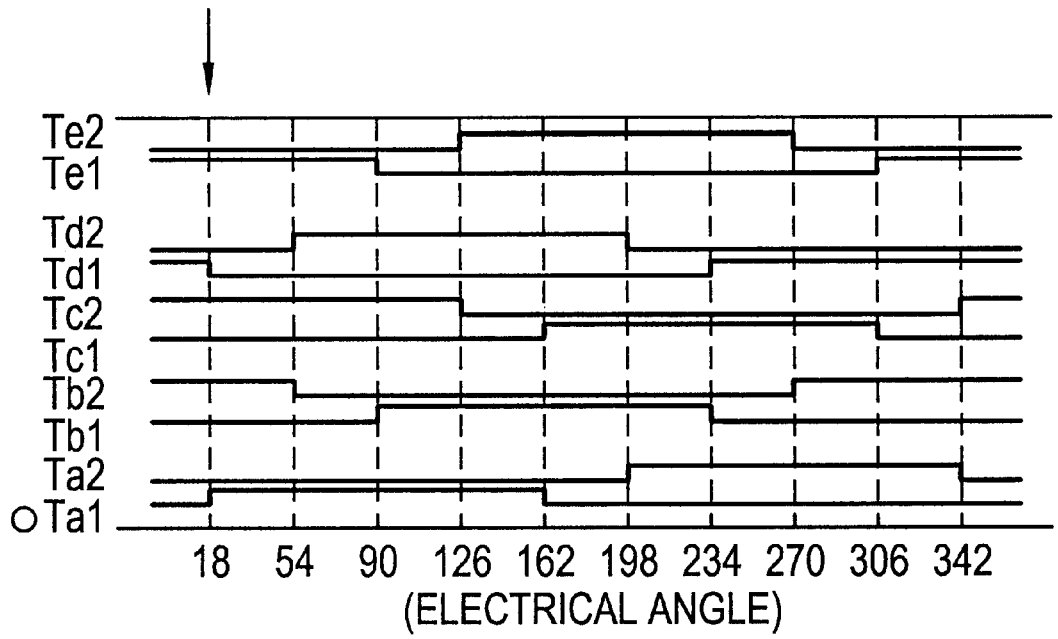
(D) ROTOR POSITION
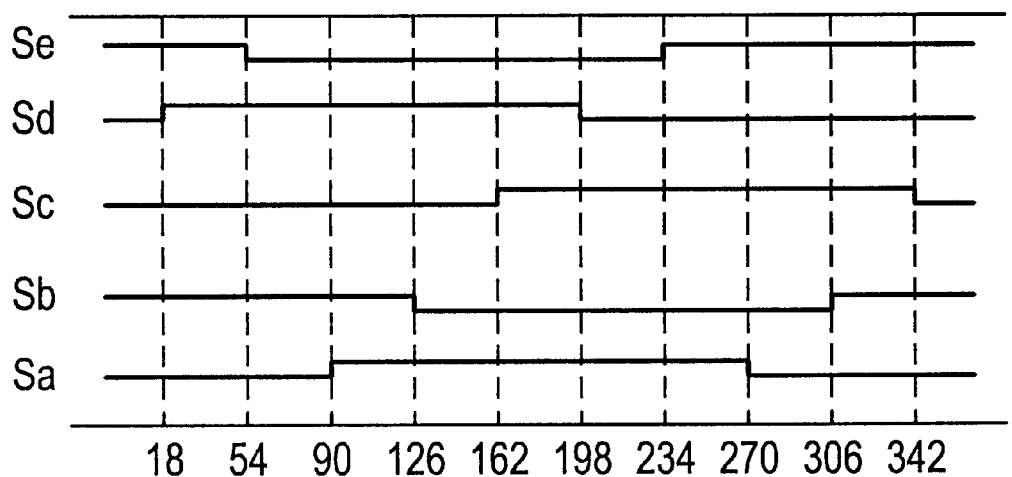

(EMBODIMENT 2)

FIG. 16
(A) COUNTER ELECTROMOTIVE VOLTAGE
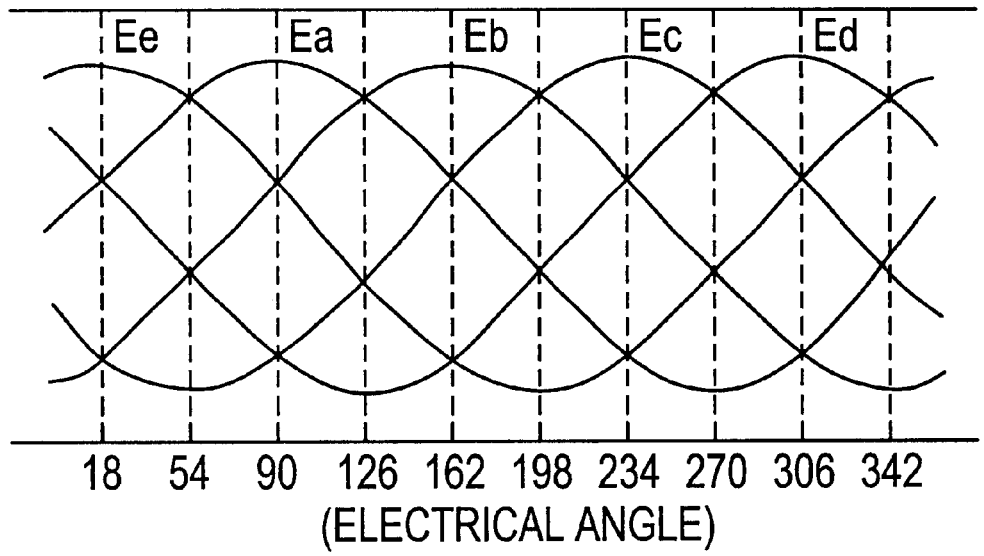
(B) G'pc
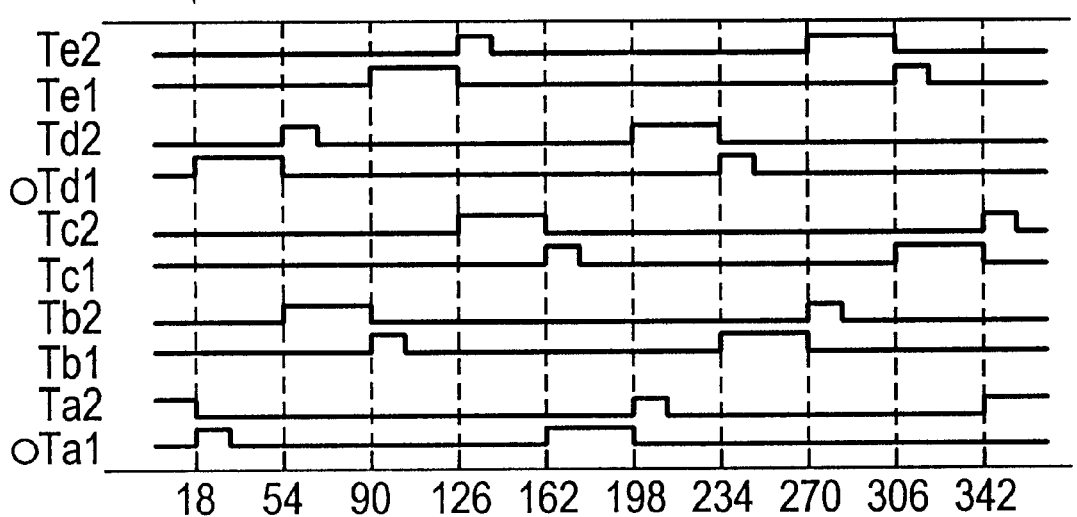

FIG. 17
(C) G" 1-10 (⟶ Duty 1)
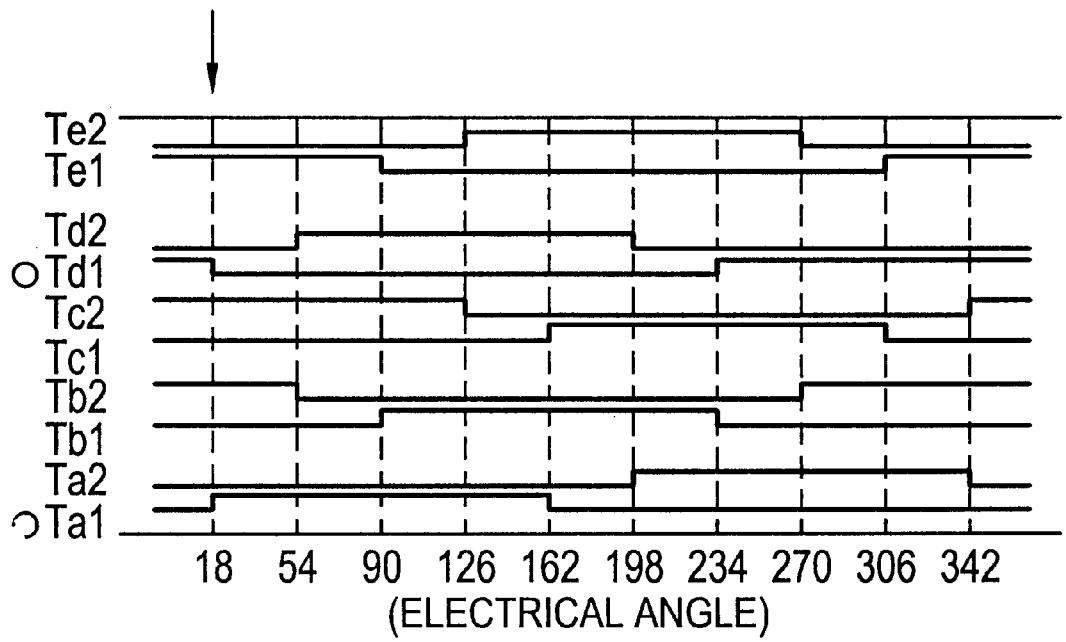
(D) ROTOR POSITION
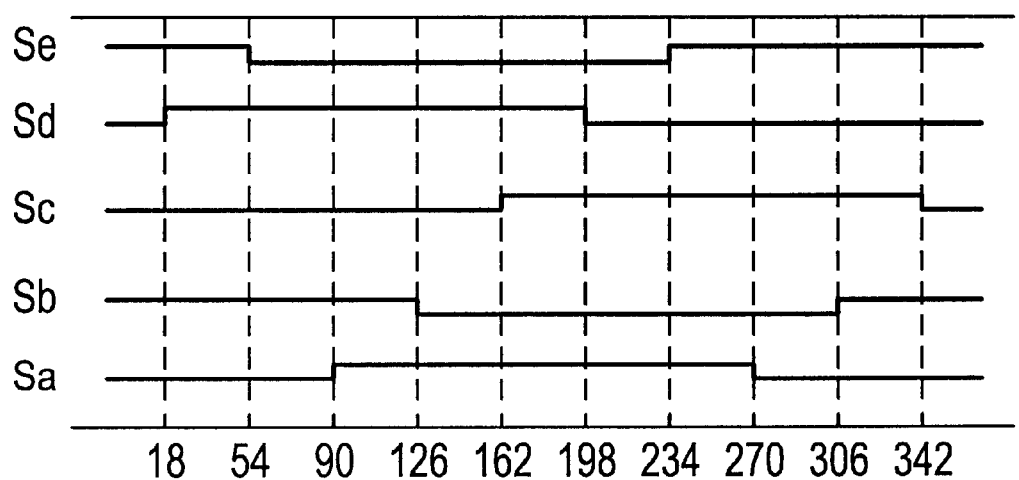

TORQUE WAVEFORM DISREGARDED
OFF-PHASE RESIDUAL CURRENT

EQUIVALENT CIRCUIT OF OFF-PHASE EXCITING COIL AT PWM-ON

EQUIVALENT CIRCUIT OF OFF-PHASE EXCITING COIL AT PWM-OFF

PWM WAVEFORM OF OFF-PHASE COIL, WAVEFORM OF APPLIED VOLTAGE AND WAVEFORM OF RESIDUAL CURRENT

EQUIVALENT CIRCUIT OF OFF-PHASE COIL

MOTOR DRIVE CONTROL APPARATUS

TECHNICAL FIELD

The present invention relates to a motor drive control system suitable for use for controlling the drive of a motor, such as a brushless motor or a linear motor, each of which has a plurality of excitation phases, through the use of rectangular waves.

BACKGROUND ART

For example, a brushless motor, which has been employed as a drive source for a power steering apparatus of a motor vehicle, is a motor having three or more excitation phases, with driving being performed by rectangular excitation currents.

In the case of a five-phase brushless motor, in general, a motor drive circuit is made to rotationally drive a rotor of this motor in a manner to cause excitation with rectangular currents while successively switching five-phase (a-phase, b-phase, c-phase, d-phase and e-phase) exciting coils a to e, disposed to surround an outer circumferential surface of the rotor in a state separated by an electrical angle of 72°, by phases according to a four-phase exciting method of performing the four-phase excitation simultaneously under control by a control circuit comprising a microcomputer or the like. In this four-phase exciting method, motor current always flows to four of five phases, while, for supplying the current to each of the phases in a well-balanced condition, all the resistances of the exciting coils are designed to be equal to each other. Incidentally, in the four-phase exciting method for the five-phase brushless motor, of the five phases, a phase to which the motor current flows is referred to as an "ON-phase", and a phase to which it does not flow is called an "OFF-phase".

Such a motor drive circuit is made up of 10 field effect transistors (FETs). These 10 transistors constitute 5 series transistor circuits, each of which is constructed by connecting two transistors, corresponding to each other, in series, and are connected between the positive and negative terminals of a power source. Further, the connecting parts of the two transistors of each of the series transistor circuits are coupled to the external terminals of 5 exciting coils "a" to "e", connected in a Y-configuration, thus establishing a connection with a coil circuit of the motor.

For instance, the direction and length of an exciting current to be supplied from this motor drive circuit to each of the exciting coils is as shown in FIG. 1 with respect to the value of a rotating angle (electrical angle) of the rotor. That is, the exciting coils are successively switched by phases at an interval of 36° in electrical angle, and each phase coil is excited for 14° in electrical angle so that the rotor rotates continuously. In FIG. 1, when the electrical angle is taken as θ, the intervals of $0 \leq \theta < 36°$, $36° \leq \theta < 72°$, $72° \leq \theta < 108°$, $108° \leq \theta < 144°$, $144° \leq \theta < 180°$, $180° \leq \theta < 216°$, $216° \leq \theta < 252°$, $252° \leq \theta < 288°$, $288° \leq \theta < 324°$ and $324° \leq \theta < 360°$ are expressed by (1), (2), ..., (10).

In this instance, the a-phase current flows in the positive direction in the intervals (1) and (2), becomes "0" in the interval (3), flows in the negative direction in the intervals (4) to (7), becomes "0" in the interval (8), and again flows in the positive direction in the intervals (9), (10) and (1). The b-phase current flows in the positive direction in the intervals (1) to (4), becomes "0" in the interval (5), flows in the negative direction in the intervals (6) to (9), becomes "0", and again flows in the positive direction in the interval (1). The c-phase current flows in the negative direction in the interval (1), becomes "0" in the interval (2), flows in the positive direction in the intervals (3) to (6), becomes "0" in the interval (7), and again flows in the negative direction in the intervals (8) to (10) and (1). The d-phase current flows in the negative direction in the intervals (1) to (3), becomes "0" in the interval (4), flows in the positive direction in the intervals (5) to (8), becomes "0" in the interval (9), and again flows in the negative direction from the interval (10). The e-phase current assumes "0" in the interval (1), flows in the positive direction in the intervals (2) to (5), becomes "0" in the interval (6), flows in the positive direction in the intervals (7) to (10), and again becomes "0" in the interval (1). Accordingly, at the boundary (the switching point at every 36° in electrical angle) of each of the intervals (1) to (10), two of five exciting coils are switched in opposite directions.

Although this switching of the excitation current can be expressed in principle by the leading edges and trailing edges of the rectangular waves as shown in FIG. 1, in fact the leading edges and the trailing edges do not vary at right angles with respect to its horizontal axis, and some amount of time Δt (approximately three times the time constant of the motor circuit) is needed until the exciting current rises in the positive direction or falls in the negative direction. For example, at the boundary (288° in electrical angle) between the interval (8) and the interval (9) in FIG. 1, the a-phase current rises from "0" to a positive constant value, while the d-phase current falls from a positive constant value to "0", and both the b-phase and c-phase currents assume a negative constant value, and even the e-phase current is at positive constant value. The variations at these boundary portions are shown enlarged in FIG. 2.

In detail, the a-phase rising (first transition) current increases gradually from "0" to the positive constant value for the time Δt, while the d-phase falling (last transition) current decreases from the positive constant value to "0" for time Δt1 shorter than the time Δt (less than the time constant of the motor circuit). At this time, the other three phases, the b-phase, c-phase and e-phase are not intended to vary. When the five-phase currents are expressed with $i_a$, $i_b$, $i_c$, $i_d$ and $i_e$, the following relationship occurs among these currents.

$$i_a + i_d + i_e = -(i_b + i_c) = I \tag{1}$$

Thus, when the a-phase and d-phase currents vary as mentioned above, the b-phase, c-phase and e-phase currents also vary. That is, since the rates of current change in the a-phase and the d-phase differ from each other, the sum of the two phase currents does not assume a constant value, and as a result of the variation of the b-phase and c-phase currents shown in FIG. 2, the e-phase current also varies for the aforesaid time Δt. This current variation causes a transient torque variation.

The above-mentioned difference between the rates of current change of the rise and fall of the two phase currents is based upon the following principle. First, let it be assumed that a power supply voltage to be given to the motor drive circuit is taken to be Vb and the voltage at the central connection point of the exciting coils "a" to "e" which are connected in a radiating arrangement is taken as Vn. Further, the interval of the time Δt1 is indicated by ① and the interval of the time Δt2 (=Δt−Δt1) is indicated by ②.

In the interval indicated by ①, the d-phase (OFF-phase) current $i_d$, switching from the positive to "0", falls from half (I/2) of energizing current I, to be supplied from the motor drive circuit to the motor, to "0" at a rate of change depending upon −Vn, a reverse electromotive voltage Ed of the coil and a time constant of the motor circuit. At this time, if a voltage to be applied to an OFF-phase equivalent circuit is taken to be $V_{OFF}$, $V_{OFF}=-Vn-E_d<0$, and Vn becomes nearly Vb/2. On the other hand, the a-phase (ON-phase) current $i_a$ rises from "0" at a rate of change depending upon a voltage Vb, −Vn, a reverse electromotive voltage $E_a$ of the coil and a time constant of the motor circuit. At this time, if a voltage to be applied to an ON-phase equivalent circuit is taken to be $V_{ON}$, $V_{ON}=Vb \cdot Duty1$ (a duty ratio of a rectangular wave)−Vn−$E_a$. Explaining with equations, through the OFF-phase equivalent circuit, the current $i_d$ is expressed by the following equation (2), where T denotes an electrical time constant of the equivalent circuit and R depicts a resistance of the equivalent circuit.

$$i_d(t)=I/2 \cdot e^{-t/T}+V_{OFF}/R \cdot (1-e^{-t/T}) \quad (2)$$

Accordingly, when t=0, $i_d$=I/2.

On the other hand, through the ON-phase equivalent circuit, the current $i_a$ is expressed by the following equation.

$$i_a(t)=V_{ON}/R \cdot (1-e^{-t/T}) \quad (3)$$

Accordingly, when t=0, $i_a$=0, and when t→∞, $i_a=V_{ON}/R=I/2$. Thus, the rates of change of the currents $i_d$ and $i_a$ in the OFF-phase and the ON-phase are given by the following equations (4) and (5), respectively.

$$\begin{aligned} di_d(t)/dt &= -(1/T)(I/2)e^{-t/T}+(1/T)(V_{OFF}/R)e^{-t/T} \quad (4)\\ &= -(I/2-V_{OFF}/R)(1/T)e^{-t/T}\\ &= -(I/2+Vn/R+E_d/R)(1/T)e^{-t/T} \end{aligned}$$

$$\begin{aligned} di_a(t)/dt &= (1/T)(V_{ON}/R)e^{-t/T} \quad (5)\\ &= (I/2)(1/T)e^{-t/T} \end{aligned}$$

In the above equations (4) and (5), since $(I/2+Vn/R+E_d/R)>I/2$, the rate of current change in the OFF-phase is greater than the rate of current change in the ON-phase. In particular, when the resistance R of the equivalent circuit is low, when the power supply voltage Vb (≈2Vn), or when the counter electromotive voltage $E_d$ at a high operation speed is high, the rate of current change in the OFF-phase is considerably greater than the rate of current change in the ON-phase. Accordingly, the time (Δt) to be taken until the ON-phase current $i_a$ rises from "0" to I/2 is longer than the time (Δt1) to be taken until the OFF-phase current $i_d$ falls from I/2 to "0". That is, at the end of the interval indicated by ①, the ON-phase current $i_a$ does not reach I/2, but is still in the process of rising.

Following this, in the interval indicated by ②, the ON-phase current $i_a$ finally reaches the constant value I/2, with a time Δt2 (twice to three times the time constant of the motor circuit) being necessary to reach it. For this reason, the rates of current change differ at the rise and fall of two phase currents when they are switched.

As described above, in the exciting current control by the conventional motor drive circuit, since the rates of change at the rise and fall of the currents for two phases (for example, the a-phase and the d-phase in FIG. 1) to be switched differ from each other, the non-switched phase currents (for example, the b-, c- and e-phases) vary, which causes transient torque variation.

For suppressing such current variation generating the torque variation at the phase switching, the control of the current for each phase will do. However, in this case there is a need to detect the current for each phase for that control, and 2 or more current detecting circuits become necessary. In particular, since the five-phase brushless motor has employed the four-phase exciting method, there has been a problem in that the motor drive circuit requires four current detecting circuits and four current loops, which leads to a complicated configuration of the drive circuit and to further increases in cost.

Meanwhile, FIG. 3 is a characteristic diagram showing a phase current waveform for each exciting coil and a torque waveform in a conventional five-phase brushless DC motor drive control system. As is obvious from this illustration, the end of the OFF-phase energizing period takes place by the time the next commutation begins.

However, in the case of the conventional brushless DC motor drive control system, although the end of the period of the energization by the pulse width modulation (PWM) drive takes place by the time the next commutation begins, when the rotational speed of the motor is low (if the time between two commutations is long), the OFF-phase current already comes into an intermittent current mode in the PWM drive before the next commutation begins, while the OFF-phase residual current approaches "0" but does not reach "0". The residual current still flows continuously except that the OFF-phase energization completely comes to an end, and the electromagnetic torque due to that residual current shows an effect of reducing the electromagnetic torque of the entire motor.

Thus, at the time the next commutation begins, rapid level variation occurs at originally continuous portions in the torque waveform as shown in FIG. 3. Especially in cases where the motor torque constant is high and the residual current is large, the rapid level variation of the torque becomes extreme, so that it is impossible to disregard the influence of this rapid torque level variation. This rapid torque level variation causes the occurrence of vibrations or noise in the motor revolution. In addition, for a brushless DC motor for a power steering apparatus, during gradual operation of a steering wheel, the rapid torque level variation not only influences the steering feel but also causes the generation of noise.

Furthermore, in the excitation current waveform shown in FIG. 3, if the positive side (forward current) drive duty ratio (for example, taken as Duty1, and referred to hereinafter as an "upper drive duty ratio") differs from the negative side (counter current) drive duty ratio (for example, taken as Duty3, and referred to hereinafter as a "lower drive duty ratio"), in the case that one current detecting circuit is provided in the motor drive circuit, since the rates of change at the rise and fall of two phase currents at the phase switching differ from each other, the currents for the other phases not being in the switched condition vary largely at the phase switching, so that the current variation produces transient torque variation.

The present invention has been developed in consideration of the above-described circumstances, and it is an object of the invention to provide a motor drive control system capable of suppressing current variation causing the occurrence of torque variation with a simple circuit arrangement and without use of 2 or more current detecting circuits. Further, another object of the present invention is to provide a motor drive control system capable of, in the case of controlling the drive of a brushless DC motor with rectangular waves, suppressing torque variation producing rapid level variation, and normal suppressing torque variation.

DISCLOSURE OF THE INVENTION

The present invention relates to a motor drive control system which controls the drive of a motor having a plurality of excitation phases, and the motor drive control system comprises a drive means for producing an exciting signal to be supplied to each of the excitation phases of the motor and a control means for determining a direction of the exciting signal for each of the excitation phases and for conducting an ON/OFF switching operation, with the control means being made to control a rate of change of the exciting signal to be switched at the switching operation.

Furthermore, the present invention relates to a motor drive control system which controls a rate of change of a current for commutation phases to prevent variation of the sum of currents of the commutation phases in exciting coils of a brushless DC motor, wherein a time period (energizing period), for which a drive current is supplied to an OFF-phase in the exciting coils according to a pulse width modulation, is limited to eliminate a residual current for the OFF-phase of the commutation phases in the exciting coils.

The present invention relates to a motor drive control system which controls the drive of a motor having a plurality of excitation phases without using two or more current detecting circuits for detecting exciting currents in the motor, and the motor drive control system comprises a drive means for producing an exciting signal to be supplied to each of the excitation phases of the motor and a control means for determining a direction of the exciting signal for each of the excitation phases and for conducting an ON/OFF switching operation, with the control means producing the exciting signal to maintain the sum of the exciting currents for the excitation phases in the motor constant at the switching operation.

BRIEF DESCRIPTION OF THE DRAWINGS

FIG. 10 is a waveform diagram showing a reverse electromotive voltage of each phase in a five-phase brushless motor and a current rate-of-change control gate signal for a falling phase at exciting current switching in a first embodiment;

FIG. 11 is a waveform diagram showing a drive signal for each phase and a rotor position detection signal produced in the first embodiment;

FIG. 13 is a waveform diagram showing a counter electromotive voltage of each phase in a five-phase brushless motor and a current rate-of-change control gate signal for a rising phase at exciting current switching in a second embodiment;

FIG. 14 is a waveform diagram showing a drive signal for each phase and a rotor position detection signal produced in the second embodiment;

FIG. 16 is a waveform diagram showing a counter electromotive voltage of each phase in a five-phase brushless motor and a current rate-of-change control gate signal for a rising phase at exciting current switching in a third embodiment;

FIG. 17 is a waveform diagram showing a drive signal for each phase and a rotor position detection signal produced in the third embodiment;

FIG. 20 is a circuit diagram showing an equivalent circuit of an OFF-phase exciting coil at PWM-ON;

BEST MODE FOR CARRYING OUT THE INVENTION

Figure 4:
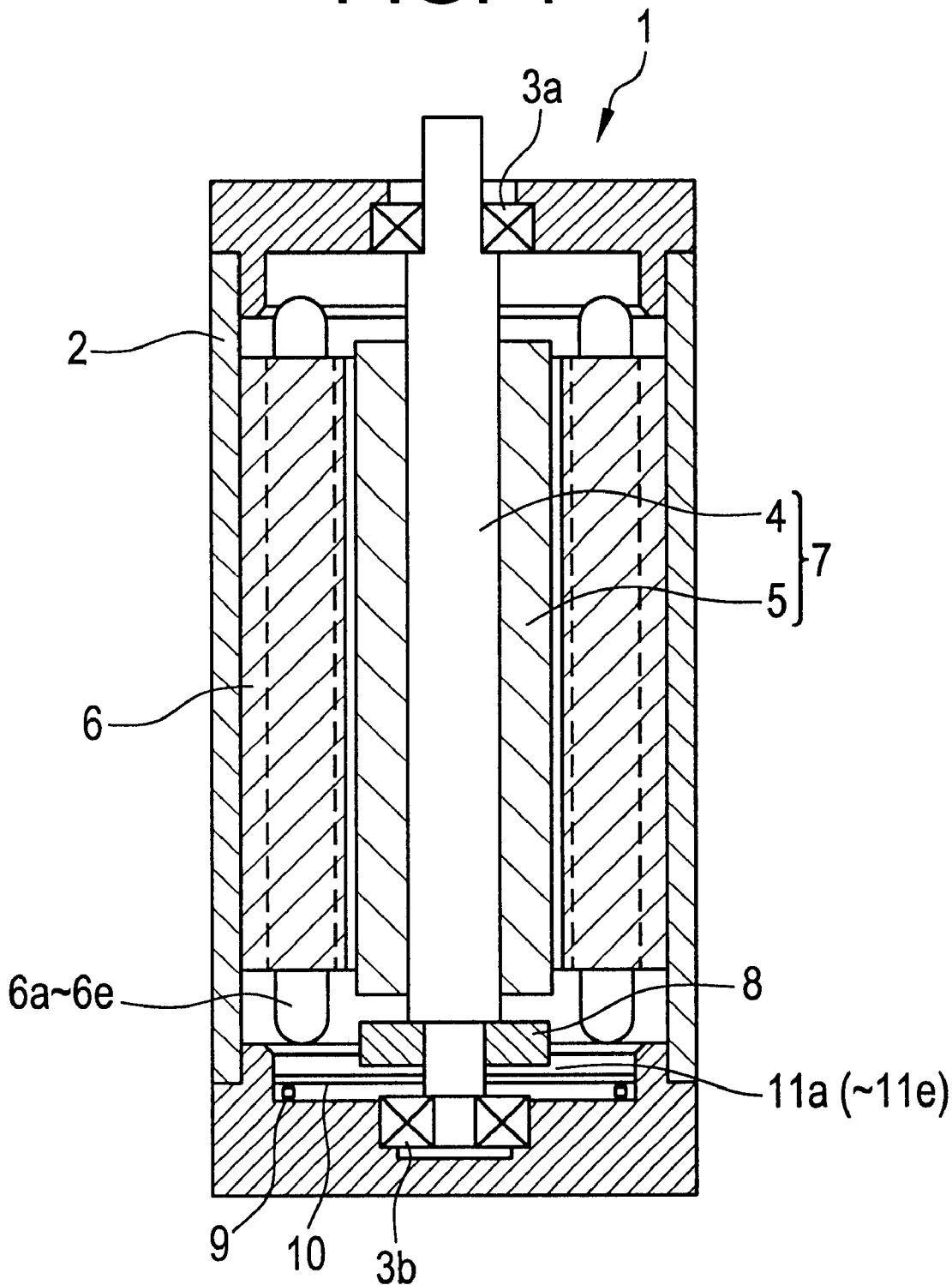
FIG. 4 is a cross-sectional view showing a five-phase brushless motor.

FIG. 4 is a longitudinal cross-sectional view showing an internal structure of a five-phase brushless motor 1 forming one example of motors to be drive-controlled by a motor drive control system according to the present invention. This five-phase brushless motor 1 is composed of a cylindrical housing 2, a rotary shaft 4 placed along the axis of the housing 2 and rotatably supported by bearings 3a and 3b, a motor drive permanent magnet 5 fixedly secured to the rotary shaft 4, and a stator 6 which is fixedly secured to an inner circumferential surface of the housing 2 to surround the permanent magnet 5 and on which exciting coils 6a, 6b, 6c, 6d and 6e for five phases are wound, with the rotary shaft 4 and the permanent magnet 5 constituting a rotor 7.

An annular permanent magnet 8 for phase detection is fixedly located in the vicinity of one end portion of the rotary shaft 4 of the rotor 7, and is magnetized in a circumferential direction to establish S-poles and N-poles alternately at equal intervals. Further, on an end surface on the side where the bearing 3b is placed in the housing 2, through the stator 9, a supporting base plate 10 comprising annular sheets is placed so that its inner insulating portion confronts the permanent magnet 8. A phase detecting element 11 made up of, for example, a Hall element is fixedly placed on the permanent magnet 8 side surface of the supporting base plate 10 to be in opposed relation to the permanent magnet 8. Additionally, the number of the phase detecting elements 11 is 5 (11a to 11e) are arranged at an appropriate interval in a circumferential direction, corresponding to drive timings for exciting coils 6a to 6e. In FIG. 4, of these, only one phase detecting element 11 is illustrated.

Figure 5:
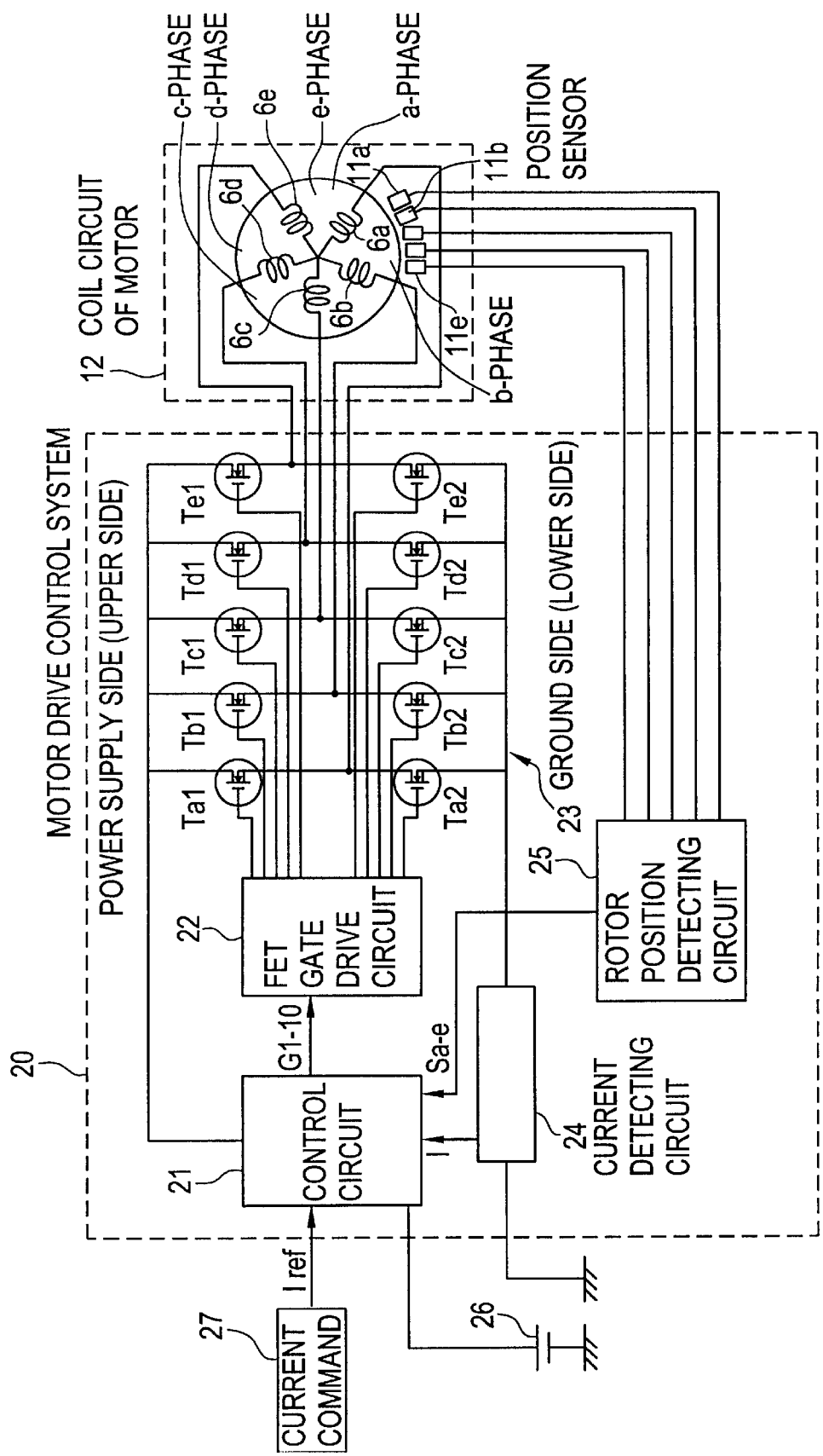
FIG. 5 is a functional block diagram showing an electrically driven power steering apparatus.

Each of the phase detecting elements 11a to 11e outputs an "H" sensor signal as a position detection signal when the magnetic pole of the permanent magnet in opposed relation thereto is the N-pole while outputting an "L" sensor signal when it is the S-pole. Each of these phase detecting elements 11a to 11e is capable of detecting the rotational position of the rotor 7 by utilizing the variation depending on the magnetic pole of the permanent magnet 8 confronting each element as shown in FIG. 5, with each of the detection outputs being inputted to a rotor position detecting circuit 25. A motor drive control system 20 is made to perform the rotational drive of the rotor 7 according to a four-phase exciting method of successively switching the exciting coils to be energized by phases while simultaneously conducting the energizing of four phases to the five-phase exciting coils 6a to 6e in connection with the rotational position of the rotor 7.

On the other hand, the five-phase exciting coils 6a to 6e are disposed to surround the outer circumferential surface of the rotor 7 in a state separated by 72° from each other, and are radiatingly connected in a Y-like configuration, thereby constituting a coil circuit 12 of the motor. Additionally, in the case of the four-phase exciting method, a motor current flows in four phases, whereas since the current is inversely proportional to the coil resistance, for supplying the current to each phase in a well-balanced condition, all the coil resistances of the exciting coils 6a to 6e are made to be equal to each other. Further, the stator 6 has 30 slots formed at equal intervals at a stator core inner circumferential surface (not shown), and further has projections, whose number is equal thereto, among these slots. Of these projections, every five projections constitute one set, and each of the exciting coils 6a to 6e is wound around each of the sets. One ends of the exciting coils 6a to 6e are connected in an assembled state, while the other ends are connected to the motor drive control system 20.

The motor drive control system 20 is, as shown in FIG. 5, composed of a control circuit 21, an FET gate drive circuit 22, a motor drive circuit 23, a current detecting circuit 24 and a rotor position detecting circuit 25. In this case, the control circuit 21 corresponds to the control means in the present invention, while the FET gate drive circuit 22 and the motor drive circuit 23 correspond to the drive means in the present invention.

The control circuit 21 is made up of, for example, a microcomputer, and receives a constant voltage from a constant voltage source 26. To the control circuit 21, a current command Iref is inputted from an external circuit 27, a motor current detection value I is inputted from the current detecting circuit 24, and rotor position signals Sa–e (=Sa, . . . , Se) are inputted from the rotor position detecting circuit 25. On the basis of these input signals, the control circuit 21 controls a drive current to be supplied from the motor drive circuit 23 to the motor coil circuit 12.

In the case in which a five-phase brushless motor is used as a drive source for the aforesaid electrically driven power steering apparatus, the external circuit 27 is designed to retrieve the corresponding motor current value by referring to a characteristic diagram on the basis of a vehicle speed detection value V obtained from an output of a vehicle speed sensor which generates a pulse signal corresponding to the number of revolutions of an output shaft of a transmission of a motor vehicle and a detection value T including a direction of a torque obtained from an output of a torque sensor which detects a steering torque applied to an input shaft of a steering wheel, and outputs it as a current command Iref. Although this can be constructed using a circuit such as a CPU which is capable of conducting the above-described operation, it is also appropriate to, in place of this circuit, employ a structure in which the outputs of the vehicle speed sensor and the torque sensor are inputted to the control circuit 21, which in turn produces the current command Iref.

The motor drive circuit 23 is made up of 5 field-effect transistors on the power supply side (upper side) and 5 field-effect transistors on the ground side (lower side), 10 field-effect transistors Ta1 to Te1, Ta2 to Te2 in total. Of these 10 transistors Ta1 to Te1 and Ta2 to Te2, every two corresponding transistors on the upper and lower sides are connected in series to each other, and the upper terminal of each of the pairs of transistors (Ta1-Ta2, Tb1-Tb2, Tc1-Tc2, Td1-Td2, Te1-Te2) series-connected is connected to the control circuit 21, while the lower terminal thereof is connected to the current detecting circuit 24, and further the connecting portion between each of the pairs of transistors is connected to the outside end (the side opposite to the central side in the star connection) of the corresponding one of the exciting coils 6a to 6e. Further, the gate voltage of each of the transistors Ta1 to Te2 is controlled by the control circuit 21 on the basis of the detection signals Sa–e from the rotor position detecting circuit 25.

Figure 1:
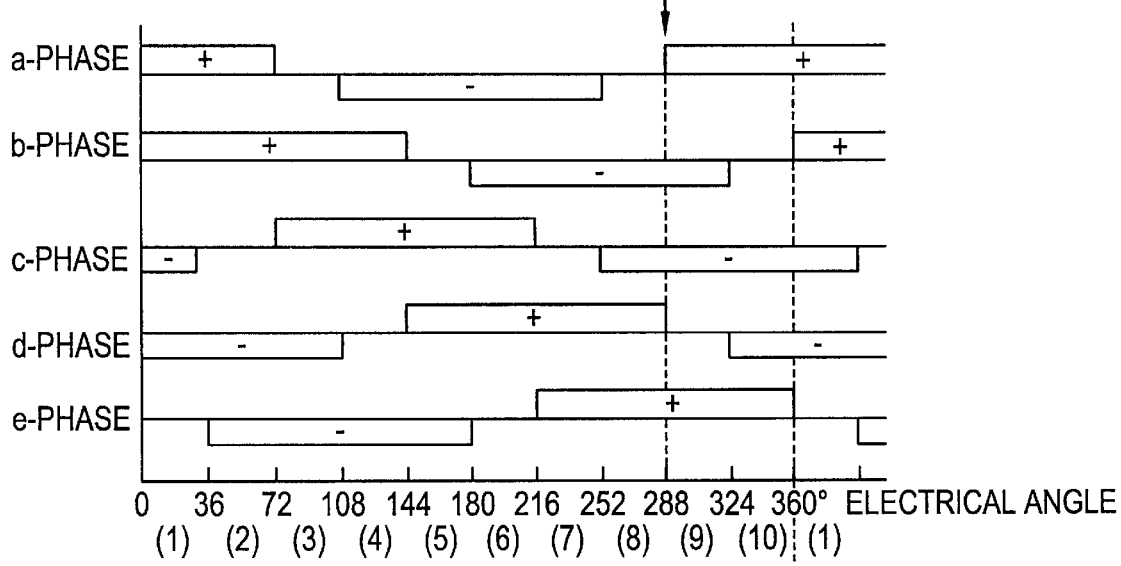
FIG. 1 is an illustration of a waveform of an exciting current for each phase in a five-phase brushless motor.

A direction and magnitude of an exciting current from the motor drive circuit 23 to each of the exciting coils 6a to 6e are basically the same as those in the conventional art and are as shown in FIG. 1, and the ON/OFF timings of the respective transistors Ta1 to Te2 are as indicated by gate signals (upper stage) Ga1 to Ge1 and gate signals (lower stage) Ga2 to Ge2 in the following table 1. Additionally, in Table 1, the gate signals Ga1 to Ge2 for ON/OFF of the transistors Ta1 to Te2 are expressed as "1", "0".

TABLE 1

| Interval | Position detection signals | | | | | Gate signal (upper side) | | | | | Gate signal (lower side) | | | | |
|---|---|---|---|---|---|---|---|---|---|---|---|---|---|---|---|
| | Sa | Sb | Sc | Sd | Se | Ga1 | Gb1 | Gc1 | Gd1 | Ge1 | Ga2 | Gb2 | Gc2 | Gd2 | Ge2 |
| (1) | H | H | L | H | L | 1 | 1 | 0 | 0 | 0 | 0 | 0 | 1 | 1 | 0 |
| (2) | H | L | L | H | L | 1 | 1 | 0 | 0 | 0 | 0 | 0 | 0 | 1 | 1 |
| (3) | H | L | H | H | L | 0 | 1 | 1 | 0 | 0 | 0 | 0 | 0 | 0 | 1 |
| (4) | H | L | H | L | L | 0 | 1 | 1 | 0 | 0 | 1 | 0 | 0 | 0 | 1 |
| (5) | H | L | H | L | H | 0 | 0 | 1 | 1 | 0 | 1 | 0 | 0 | 0 | 1 |
| (6) | L | L | H | L | H | 0 | 0 | 1 | 1 | 0 | 1 | 1 | 0 | 0 | 0 |
| (7) | L | H | H | L | H | 0 | 0 | 0 | 1 | 1 | 1 | 1 | 0 | 0 | 0 |
| (8) | L | H | L | L | H | 0 | 0 | 0 | 1 | 1 | 0 | 1 | 1 | 0 | 0 |
| (9) | L | H | L | H | H | 1 | 0 | 0 | 0 | 1 | 0 | 1 | 1 | 0 | 0 |
| (10) | L | H | L | H | H | 1 | 0 | 0 | 0 | 1 | 0 | 0 | 1 | 1 | 0 |

Figure 2:
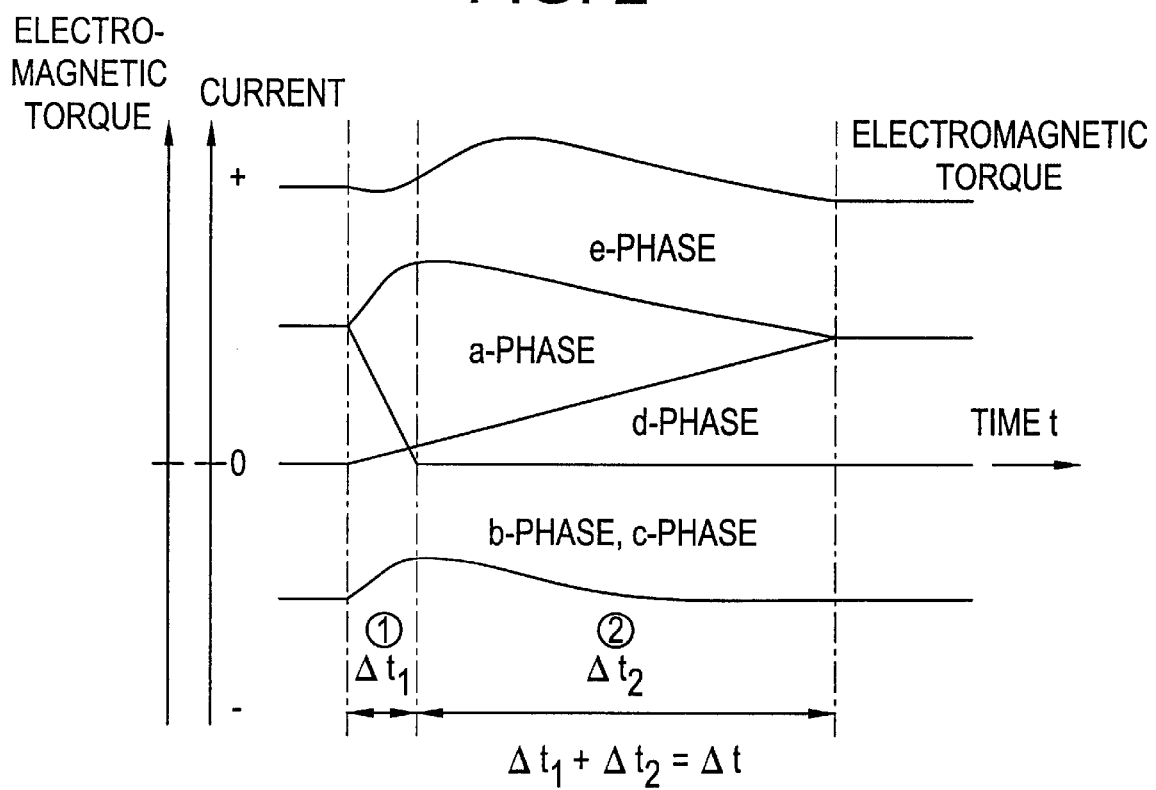
FIG. 2 is an illustration of a current variation in each phase and an electromagnetic torque variation at conventional exciting current switching.

In FIG. 1, assuming that the rotor 7 is, for example, in a condition of the interval (1), this corresponds to the interval (1) in Table 1, and the upper side transistors Ta1 and Tb1 and the lower side transistors Tc2 and Td2 are in the ON-condition while the other transistors are all in the OFF-condition; whereupon, a current flows in the exciting coils 6a, 6b from their outside end sides while a current flows in the exciting coils 6c and 6d from their connection sides. Consequently, a magnetic attraction force or repulsive force occurs between the N-pole or S-pole of the rotor 7 and the N-pole or S-pole thereat, thereby causing the rotation of the rotor 27. Further, when the rotor 27 shifts to the condition of (2) in FIG. 2, corresponding to the interval (2) in Table 1, the upper side transistors Ta1 and Tb1 and the lower side transistor Td2 and Te2 are all in the ON-condition, while the other transistors are all in the OFF-condition; whereupon a current flows in the exciting coils 6a and 6b from their outside end sides, while a current flows in the exciting coils 6d and 6e from their connection sides. Consequently, the rotor 27 further rotates.

With the repetition of the above-described operation, each transistor is driven at the timing in Table 1, and as shown in FIG. 1, the exciting coils are switched successively by phases at an interval of 36° in electrical angle to conduct the excitation for one phase for an electrical angle of 144°. Accordingly, the N-pole or S-pole occurring in the stator 5 successively shifts to cause the continuous rotation of the rotor 7. The current detecting circuit 24 has a current detection resistor coupled to the lower side transistors Ta2 to Te2 of the motor drive circuit 23, and amplifies a voltage thereacross and outputs this voltage as a detection signal for the motor current value I after the removal of noise. The rotor position detecting circuit 25 outputs, as the rotor position detection signals Sa–e, the detection signals from the phase detecting elements 11a to 11e.

In the control circuit 21, as shown in Table 1, a storage section stores a gate setting table representative of the correspondence between the preset combinations of the detection signals Sa–e from the rotor position detecting circuit 25 and the upper and lower side gate signals. This gate setting table sets the correspondence between the combinations of the detection signals Sa-e respectively equivalent to the intervals (1) to (10) each forming an electrical angle of 36° and the upper and lower side gate signals Ga1 to Ge2, designating the exciting coils, set for the intervals, where "H" of the detection signals Sa-e represents the excitation to the N-pole while "L" thereof denotes the excitation to the S-pole.

In addition, an abnormality signal is set to "0", that is, it is set to normality, for the combinations corresponding to the intervals (1) to (10), whereas the abnormality signal is set to "1", that is, set as an abnormality, for the combinations not corresponding to the intervals (1) to (10). Further, in the case of the combinations not corresponding to the intervals (1) to (10), all the gate signals Ga1 to Ge2 are set to "0" to cut off the current supply to the motor coil circuit 12.

The control circuit 21 refers to the aforesaid gate setting table on the basis of the combination of the detection signals Sa–e from the rotor position detecting circuit 25 to forward the corresponding gate signals Ga1 to Ge2 to the FET gate drive circuit 22. Further, the control circuit 21 produces a motor drive voltage command signal through the current control on the basis of the aforesaid inputted signals, and produces a pulse width modulation signal and gate drive signals $G_{1-10}$ (=Ga1 to Ge2) on the basis of this voltage command signal to send them to the FET gate drive circuit 22. The FET gate drive circuit 22 conducts a predetermined voltage supply to the gate terminals of the specified transistors in accordance with the gate drive signals $G_{1-10}$ outputted from the control circuit 21.

Figure 6:
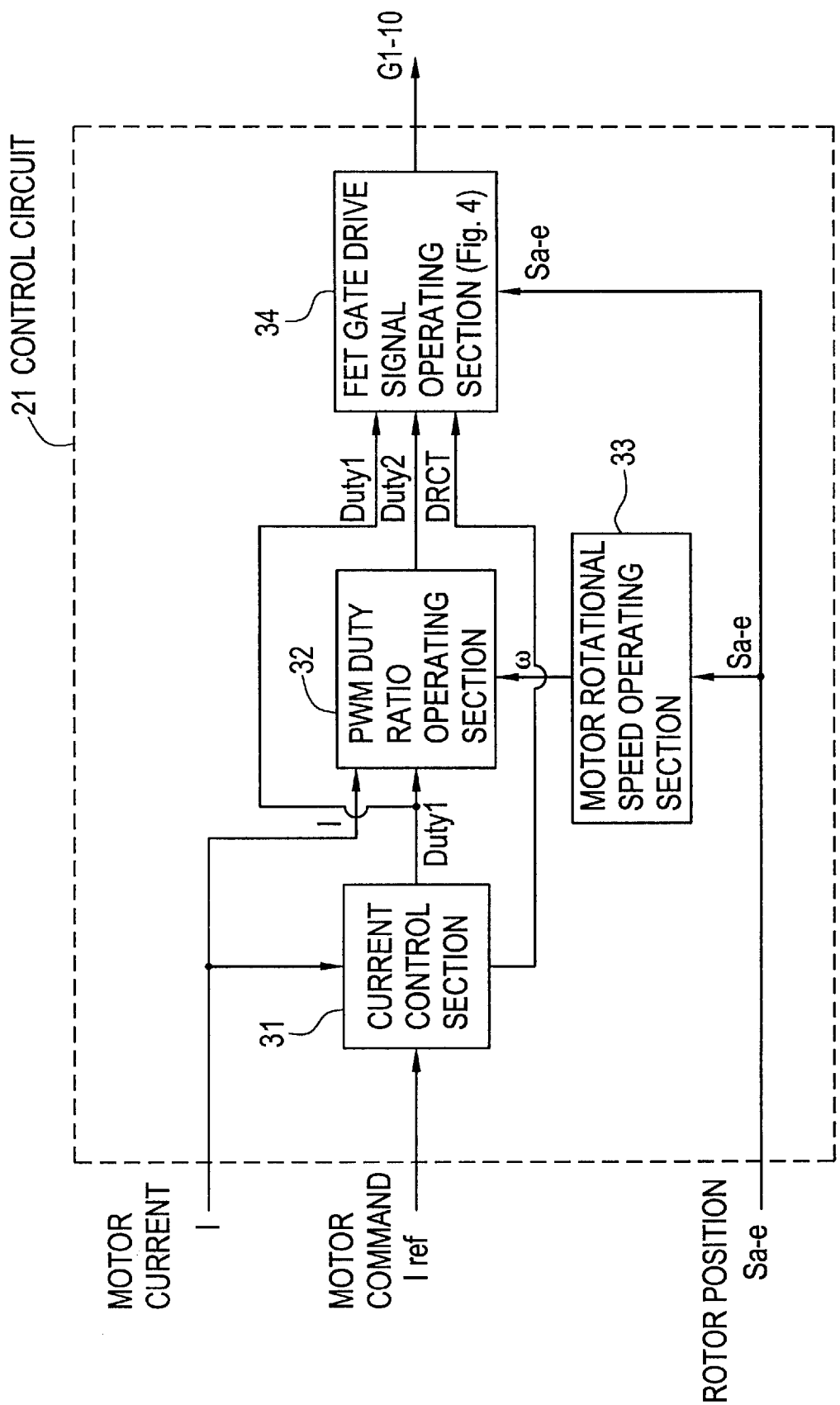
FIG. 6 is a functional block diagram showing a control circuit for use in the apparatus shown in FIG. 5.

FIG. 6 is a functional block diagram showing the control circuit 21. The control circuit 21 is functionally composed of a current control section 31, a PWM duty ratio operating section 32 for the excitation phase on which the exciting current rises (or falls) as will be described herein later, a motor rotational speed operating section 33, and an FET gate drive signal operating section 34.

In this control circuit 21, a motor current command signal Iref and a motor current value I detected by the current detecting circuit 24 are inputted to the current control section 31. The current control section 31 detects the generating direction of a torque on the basis of whether or not a torque detection value T from the aforesaid torque sensor is higher than a predetermined neutral voltage Vc and outputs an electromagnetic torque direction command signal DRCT for determining the torque direction of the motor through predetermined processing. Alternatively, it is also appropriate that a sign be given to the motor current detection value I and the electromagnetic torque direction command signal DRCT be determined by the sign of a motor drive voltage command signal produced by the current control section 31, and be outputted. The current control section 31 operates and outputs a duty ratio Duty1 of a first PWM signal for the phase other than the phase undergoing the rate of current change at the phase switching, as will be described hereinbelow.

On the other hand, the motor rotational speed operating section 33 produces a phase switching signal on the basis of the output signals Sa–e from the rotor position detecting circuit 25 to detect a motor rotational angular velocity ω from the generation frequency of the switching signal. The first PWM signal duty ratio Duty1, the motor current detection value I and the motor rotational angular velocity ω are inputted to the PWM duty ratio operating section 32 for the rising (or falling) phase undergoing the rate of current change at the phase switching. This operating section 32 calculates a duty ratio Duty2 of a second PWM signal for the phase undergoing the rate of current change, as will be described hereinbelow. The signals indicative of the aforesaid two duty ratios Duty1 and Duty2, the electromagnetic torque direction command DRCT and the rotor positions Sa–e are inputted to the FET gate drive signal operating section 34. This operating section 34 outputs FET gate drive (ON/OFF) signals $G_{1-10}$.

Figure 7:
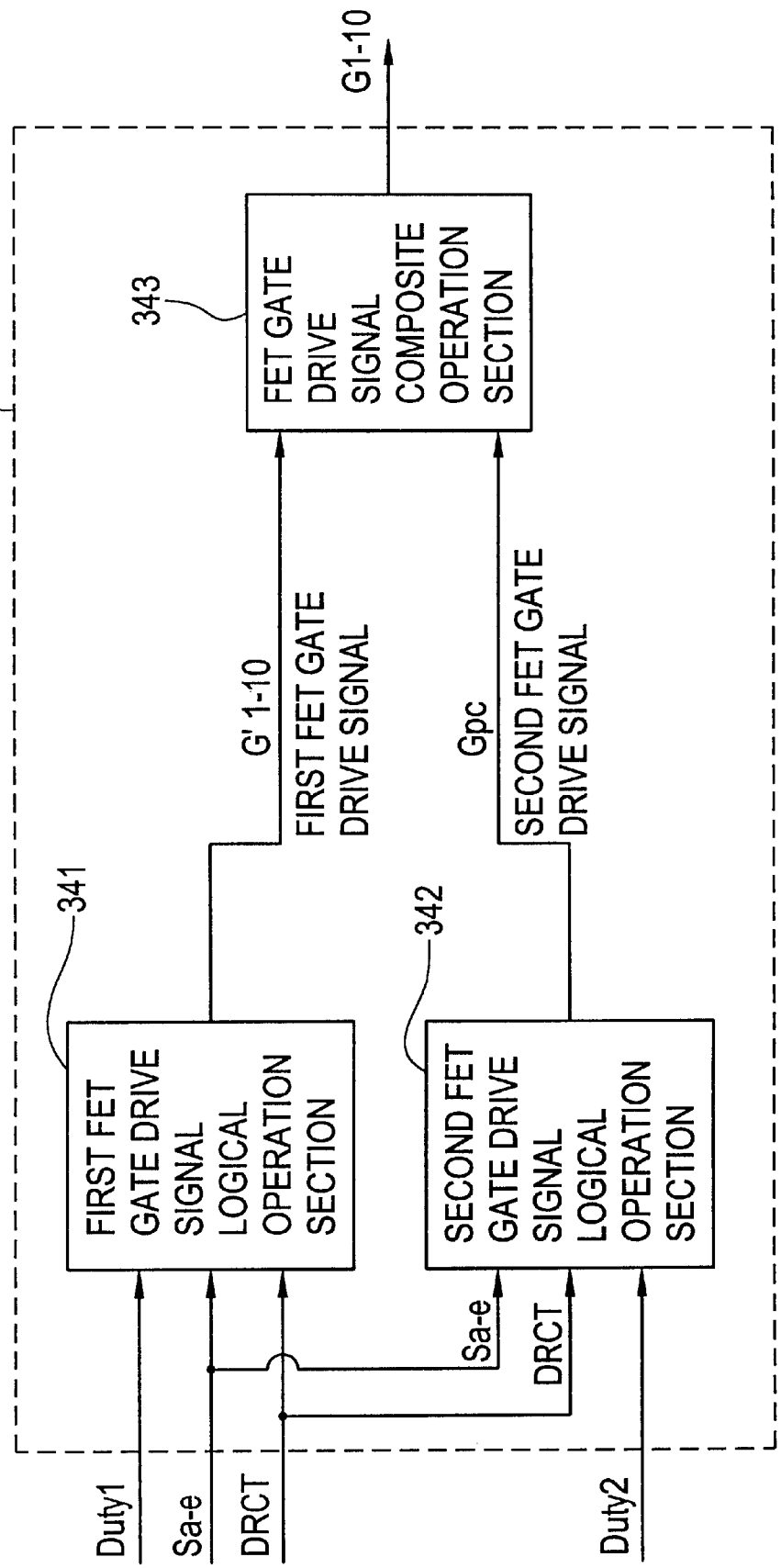
FIG. 7 is a functional block diagram showing a logical operation section for producing a gate drive signal in FIG. 6.

The aforesaid FET gate drive signal operating section 34 is, as shown in FIG. 7, composed of a first FET gate drive signal logical operation section 341, a second FET gate drive signal logical operation section 342 and an FET gate drive signal composite operation section 343.

In FIG. 7, the first FET gate drive signal logical operation section 341 produces upper and lower side FET gate drive signals $G'_{1-10}$ (=$G'_1$, ..., $G'_{10}$) on the basis of the duty ratio Duty1 of the first PWM signal, the position detection signals Sa–e and the electromagnetic torque direction command DRCT. The second FET gate drive signal logical operation section 342 produces upper and lower side FET gate drive signal $G_{PC}$ for the exciting current rising (or falling) phases on the basis of the duty ratio Duty2 of the second PWM signal, the rotor position detection signals Sa–e and the electromagnetic torque direction command DRCT. The FET gate drive signal composite operation section 343 produces FET gate drive signals $G_{1-10}$ from the aforesaid two energizing interval signals $G'_{1-10}$ and $G_{PC}$.

Figure 8:
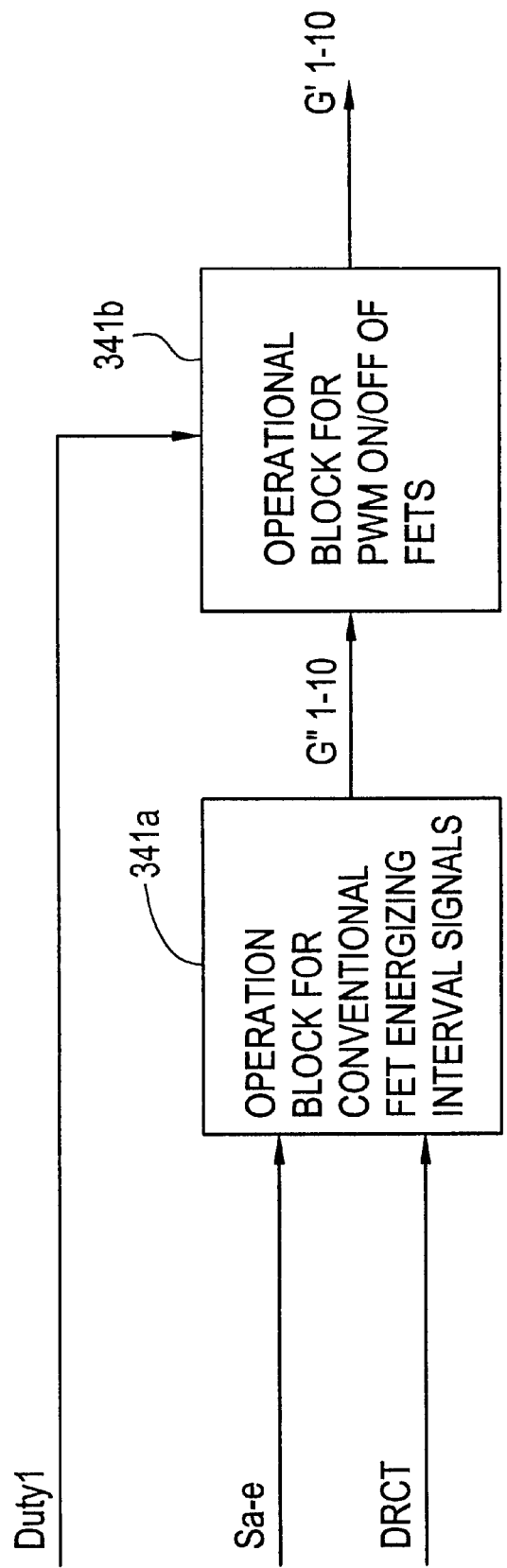
FIG. 8 is an illustration of operational blocks constituting a first FET gate drive signal logical operation section in FIG. 7.

FIG. 8 shows operational blocks constituting the first FET gate drive signal logical operation section 341. This operation section 341 is made up of an operational block 341a for producing conventional FET energizing interval signals $G''_{1-10}$ on the basis of the rotor position signals Sa–e and the electromagnetic torque direction command signal DRCT and an operational block 341b for producing FET gate drive signals $G'_{1-10}$ for the excitation phases not undergoing the control of the rate of current change on the basis of the signals $G''_{1-10}$ and the duty ratio Duty1 of the first PWM signal.

Figure 9A:
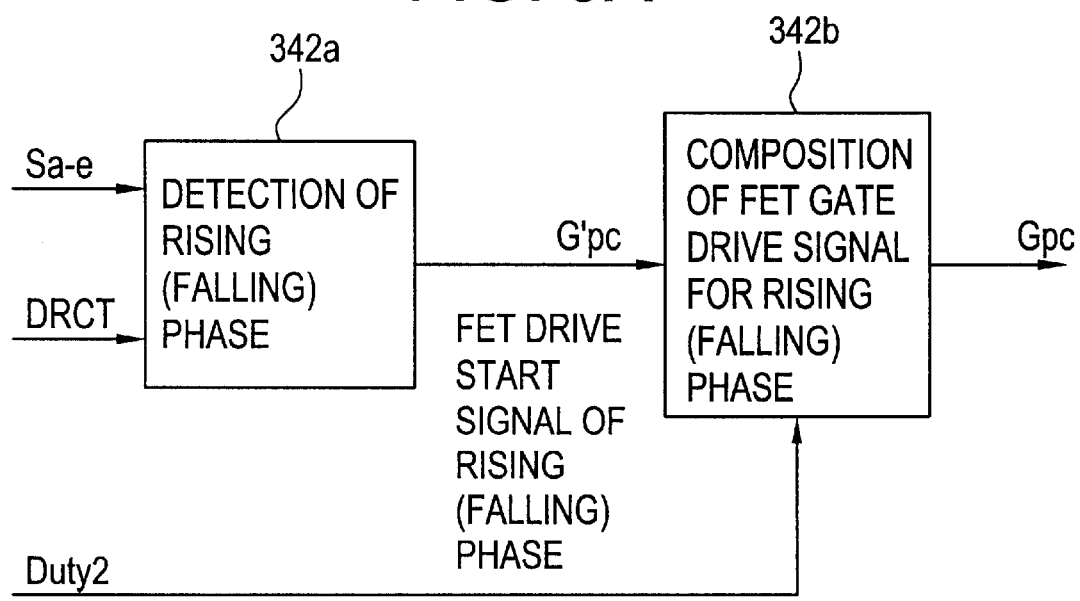
FIG. 9 is an illustration of operational blocks constituting a second FET gate drive signal logical operation section in FIG. 7.
Figure 9B:
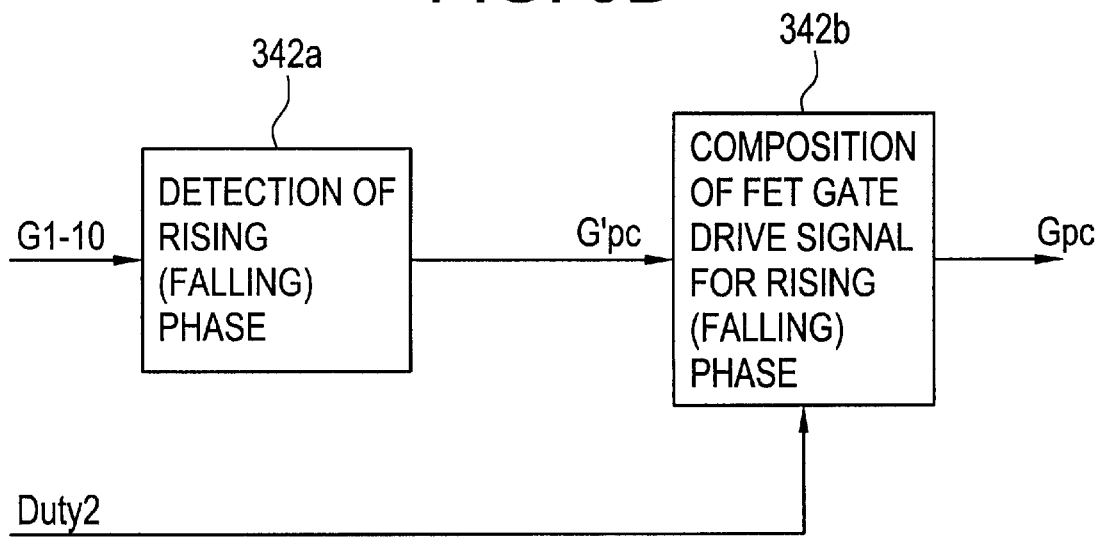

FIG. 9 shows operational blocks organizing the second FET gate drive signal logical operation section 342 in FIG. 7. In the same illustration, (A) illustrates an operational block 342a for producing FET gate drive signals $G'_{PC}$ for the rising (or falling) phase on the basis of the rotor position signals Sa–e and the electromagnetic torque direction command signal DRCT and an operational block 342b for producing FET gate drive signals $G_{PC}$ for the phase to be switched at the switching on the basis of the gate drive signals $G'_{PC}$ and the duty ratio Duty2 of the second PWM signal. Further, because the end of the energizing interval coincides with the time that the rise of this phase starts, as shown in (B) of FIG. 9, in the operational block 342a, it is also appropriate to produce drive signals $G'_{PC}$ for a phase, on which the exciting current is switched, through the use of the FET gate drive signals $G''_{1-10}$ obtained from the rotor position signals Sa–e and the electromagnetic torque direction command signal DRCT. In this case, the operation quantity is further reducible as compared with (A).

According to the present invention, as mentioned above, the control circuit 21 computes the second PWM signal duty ratio Duty2 as a function of 6 signals: the motor current I, the first PWM signal duty ratio Duty1, the motor rotational angular velocity ω, the motor counter electromotive voltage constant Km, the power supply voltage Vb to be supplied to the motor drive circuit and the resistance component of the equivalent electric circuits of the motor and the drive circuit. This operation expression is given by the following function f.

$$\text{Duty2}=f(I,\text{Duty1},\omega,Km,Vb,R) \qquad (6)$$

This function f is set such that the rates of current change for 2 phases (for example, the a-phase and d-phase) undergoing the switching of the exciting current coincide with each other or are substantially equal to each other.

Secondly, a description will be given of an example of the function f. Let it be assumed that a power supply voltage to be applied to the motor drive circuit 23 in FIG. 5 is taken to be Vb, a voltage at the central connection point of the exciting coils "a" to "e" (the junction of the phases) is taken as Vn and Vn=½·Vb. Further, when the PWM signal duty ratio for the d-phase is taken as $\text{Duty}_{2-1}$ and the PWM signal duty ratio for the a phase is taken as $\text{Duty}_{2-2}$, the voltage equations for the respective phases are represented by the following equations (7) to (11), where Lm=L−M (L represents a self-inductance for each phase and M denotes a mutual inductance between 2 phases).

a-phase: $(2\text{Duty}_{2-2}-1)*0.5Vb=Lm(di_a/dt)+i_aR_a+E_a$ \qquad (7)

b-phase: $(2\text{Duty1}-1)*0.5Vb=Lm(di_b/dt)+i_bR_b+E_b$ \qquad (8)

c-phase: $(2\text{Duty1}-1)*0.5Vb=Lm(di_c/dt)+i_cR_c+E_c$ \qquad (9)

d-phase: $(2\text{Duty}_{2-1}-1)*0.5Vb=Lm(di_d/dt)+i_dR_d+E_d$ \qquad (10)

e-phase: $(2\text{Duty1}-1)*0.5Vb=Lm(di_e/dt)+i_eR_e+E_e$ \qquad (11)

Since in the rectangular wave current drive the magnetization waveform assumes a substantial trapezoidal wave with an electrical angle of 144°, the back electromotive force approximately assumes a trapezoidal wave. At the phase switching, the absolute values of the respective phase reverse electromotive voltage s are substantially equal to each other. That is, the following equation (12) is given.

$$Ea=-Eb=-Ec=Ed=Ee=E \qquad (12)$$

Furthermore, since the respective phase coil resistances are the same, the following equation (13) is satisfied.

$$Ra=Rb=Rc=Rd=Re=R \qquad (13)$$

In order to equalize the rates of current change for two phases (in this case, the a-phase and the d-phase) to be switched, the sum of the currents for both phases is constant, while the currents for the other phases do not vary. That is, the following equation is satisfied.

$$i_a+i_d=-i_b=-i_c=i_e=i \qquad (14)$$

Thus, $$d(i_a+i_d)/dt=-di_b/dt=-di_c/dt=-di_e/dt \qquad (14)$$
$$=di/dt=0$$

If the aforesaid voltage equations (7) and (10) for the a-phase and the d-phase are added and the equations (12) to

(15) are substituted thereinto, since $(2\text{Duty}_{2-2}+2\text{Duty}_{2-1}-2)*0.5Vb=Lm(d(i_a+i_d)/dt)+i_aRa+i_dR_d+Ea+Ed$.

$$(\text{Duty}_{2-2}+2\text{Duty}_{2-1}-1)Vb=iR+2E \quad (16)$$

Furthermore, if the equations (12) to (15) are substituted into the e-phase voltage equation (11).

$$(2Duty1-1)*0.5Vb = Lm(di_e/dt) + i_eR_e + Ee \quad (17)$$

$$= iR + E$$

From these two equations (16) and (17), the relationship between the OFF-phase duty ratio $\text{Duty}_{2-1}$ and the ON-phase duty ratio $\text{Duty}_{2-2}$ is obtained according to the following equations (18) and (19), where $E=\frac{1}{2}\cdot Km\cdot\omega$, $Km[\text{volt·sec}]$ represents a voltage constant of the motor, and "I" designates a current for one phase, with a detection current being 2i if the detection is made with one current detector.

①: In the case of the elimination of iR;

$$\text{Duty}_{2-1} + \text{Duty}_{2-2} = Duty1 + 0.5 + E/Vb \quad (18)$$

$$= Duty1 + 0.5 + Km\cdot\omega/2Vb$$

②: In the case of the elimination of E;

$$\text{Duty}_{2-1} + \text{Duty}_{2-2} = 2Duty1 - iR/Vb \quad (19)$$

$$= 2Duty1 - 2i\cdot R/2Vb$$

By using any one of the aforesaid two equations (18) and (19), as described in the following embodiments 1 to 3, the second PWM signal duty ratios $\text{Duty}_{2-1}$ and $\text{Duty}_{2-2}$ for the ON/OFF-phase to be switched are obtainable. Further, in a manner such that the falling (or rising) phase drive current is controlled by the PWM signals with these duty ratios at the phase switching, the rates of current change of two phases to be switched can be coincident or substantially equal to each other, so that the conventional current variation (FIG. 2) at the phase switching is suppressible. At this time, the current to be detected is only the motor current so that only one current detecting circuit is necessary.

Embodiment 1

At the exciting current switching, the rate of current change for a falling phase (for example, the d phase) is controlled to coincide with the rate of current change of the PWM signal for a rising phase (for example, the a-phase). In this case, since the duty ratio $\text{Duty}_{2-2}$ of the PWM signal for the a-phase=Duty1, the Duty ratio $\text{Duty}_{2-1}$ of the PWM signal for the d-phase can be given as follows by equation (18).

$$\text{Duty}_{2-1}=0.5+Km\cdot\omega/2Vb \quad (20)$$

Alternatively, it is obtainable as follows through the use of equation (19).

$$\text{Duty}_{2-1}=Duty1-2i\cdot R/2Vb \quad (21)$$

In FIG. 10, (A) shows reverse electromotive voltage s Ea–e (=Ea, . . . , Ee) on the respective phases, and (B) shows rate-of-current-change control gate drive signals $G'_{PC}$ for a falling phase (the d-phase), calculated in the functional block of FIG. 9. Further, in FIG. 11, (C) illustrates upper and lower side FET gate drive signals $G''_{1-10}$ for the respective phases, calculated in the functional block of FIG. 8, and (D) illustrates the relationship in phase among the waveforms of rotor position detection signals Sa–e. In this instance, through the logical operation in FIG. 8, the gate drive signals $G''_{1-10}$ in (C) of FIG. 11 are produced from the rotor position detection signals Sa–e in (D) of FIG. 11 and an electromagnetic torque direction command DRCT, and the conventional gate drive signals $G'_{1-10}$ are produced from the drive signals $G''_{1-10}$ and the PWM signal with the duty ratio Duty1. Additionally, through the logical operation in (A) of FIG. 9, the gate drive signals $G'_{PC}$ for the falling phase (the d-phase) in (B) of FIG. 10 are produced from the rotor position detection signals Sa–e and the electromagnetic torque direction command DRCT.

The gate drive signal $G'_{PC}$ comes into "High" (1) when the gate drive signal $G''_{1-10}$ in (C) of FIG. 11 assume "Low" (0). That is, when the conventional drive signal $G''_{1-10}$ for this phase turns to "Low" (fall of the current), the fall of that current is controlled with another drive signal $G'_{PC}$. For instance, when the gate drive signal $G''_{1-10}$ for Td1 (one of the upper side FETs) in (C) of FIG. 11 becomes "Low" at an electrical angle of 18°, the gate drive signal $G'_{PC}$ for Td1 in (B) of FIG. 10 becomes "High" and then becomes "Low" at an electrical angle of 54°. The gate drive signal $G_{PC}$ for the falling phase (the d phase) is produced from this gate drive signal $G'_{PC}$ and the PWM signal with the duty ratio Duty2. The actual FET gate drive signals $G_{1-10}$ are produced by the composite operation of the aforesaid gate drive signals $G'_{1-10}$ and $G_{PC}$.

Figure 12:
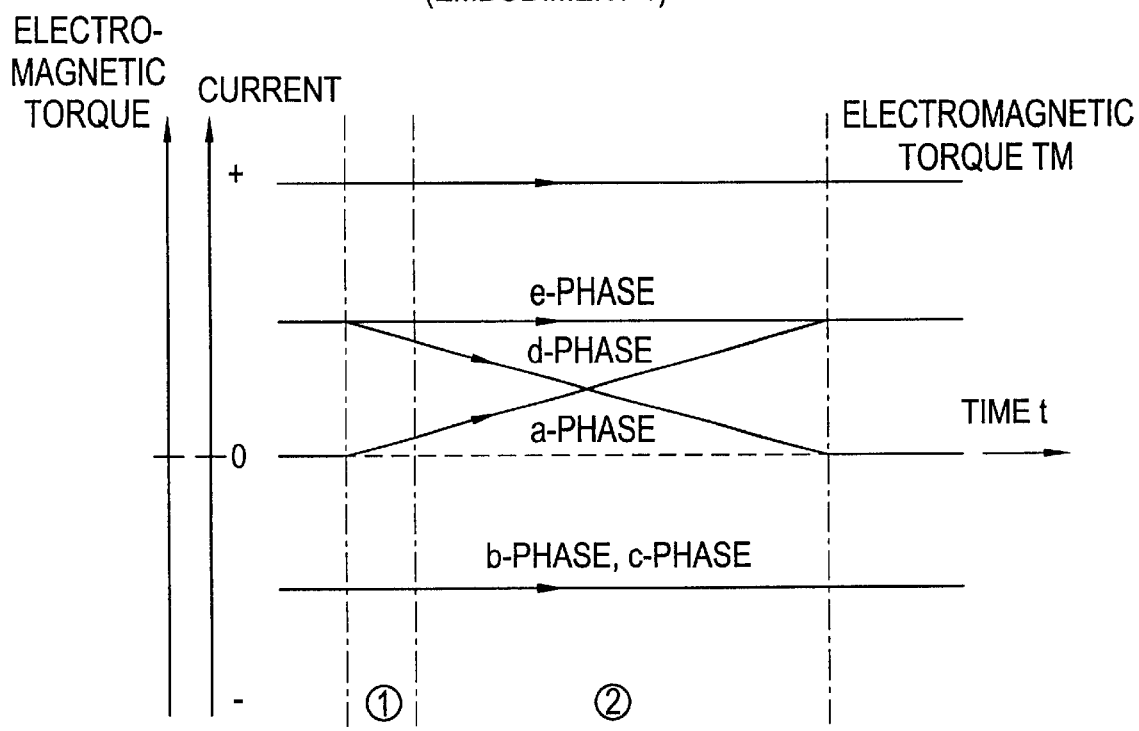
FIG. 12 is an illustration of a current variation for each phase and an electromagnetic torque variation at exciting current switching in the first embodiment.

In a manner of controlling the rate of current change for the falling phase in this way, as shown in FIG. 12, the coincidence between the rates of current changes for the falling phase (the d-phase) and the rising phase (the a-phase) is possible at the exciting current switching. Consequently, the current variation and the torque variation are considerably suppressible, as compared with the torque variation waveform (FIG. 2) due to the current variation in the conventional FET drive method.

Embodiment 2

The rate of current change for a rising phase (for example, the a-phase) is controlled at the exciting current switching to be coincident with the rate of current change of a PWM signal for a falling phase (for example the d-phase). In this case, since the PWM signal duty ratio $\text{Duty}_{2-1}$ for the d-phase=0, the PWM signal duty ratio $\text{Duty}_{2-2}$ for the a-phase is given as follows by equation (18), $$\text{Duty}_{2-2}=Duty1+0.5+Km\cdot\omega/2Vb \quad (22)$$

or it may be obtained as follows from equation (19), $$\text{Duty}_{2-2}=2Duty1-2i\cdot R/2Vb \quad (23)$$

where, if $\text{Duty}_{2-2}>1$, the setting is made as $\text{Duty}_{2-2}=1$.

In FIG. 13, (A) shows counter electromotive voltage Ea–e in the respective phases, and (B) shows rate-of-current-change control gate drive signals $G'_{PC}$ for a rising phase (the a-phase), calculated in the functional block of FIG. 9. In FIG. 14, (C) illustrates upper and lower side FET gate drive signals $G''_{1-10}$ for the respective phases, calculated in the functional block of FIG. 8, and (D) illustrates the relationship in phase among the waveforms of the rotor position detection signals Sa–e. In this case, through the logical operation in FIG. 8, the gate drive signals $G''_{1-10}$ in (C) of FIG. 14 are produced on the basis of the rotor position detection signals Sa–e in (D) of FIG. 14 and an electromagnetic torque direction command DRCT, and the conventional gate drive signals $G'_{1-10}$ are created from the drive signals $G''_{1-10}$ and the PWM signal with the duty ratio Duty1.

In addition, through the logical operation in (A) of FIG. 9, the rising phase (a-phase) gate drive signals $G'_{PC}$ in (B) of FIG. 13 are created from the rotor position detection signals Sa–e in (D) of FIG. 14 and the electromagnetic torque direction command DRCT.

The gate drive signal $G'_{PC}$ becomes "High" (1) when the gate drive signal $G''_{1-10}$ in (C) of FIG. 14 is "High" (1). That is, when the gate drive signal $G''_{1-10}$ for this phase becomes "High" (the rise of current), the rise of that current is controlled with another drive signal $G'_{PC}$. For instance, when the gate drive signal $G''_{1-10}$ for Ta1 (one of the upper side FETs) in (C) of FIG. 14 becomes "High" at an electrical angle of 18°, the gate drive signal $G'_{PC}$ for Ta1 in (B) of FIG. 13 becomes "High", and then becomes "Low" instantaneously. This is for the purpose of promoting the rise of the gate drive signals $G''_{1-10}$. The gate drive signals $G_{PC}$ for a rising phase (the a-phase) are produced from the gate drive signals $G'_{PC}$ and the PWM signal with the duty ratio Duty2. The actual FET gate drive signals $G_{1-10}$ are produced through the combined operation of the aforesaid gate drive signals $G'_{1-10}$ and $G_{PC}$.

Figure 15:
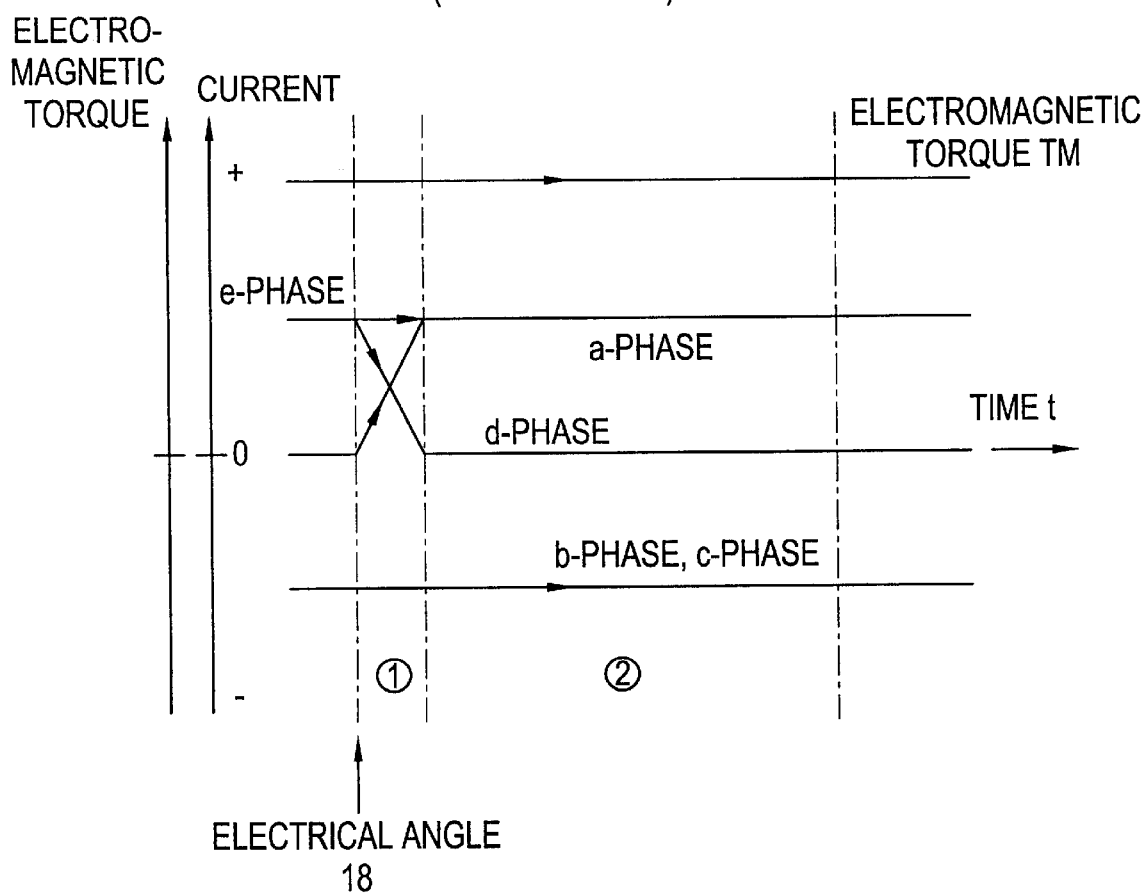
FIG. 15 is an illustration of a current variation in each phase at exciting current switching and an electromagnetic torque variation in the second embodiment.

By controlling the rate of current change in the rising phase in this way, as shown in FIG. 15, in the aforesaid interval indicated by ①, the rate of current change in the rising phase (the a-phase) can approach the rate of current change on the falling phase (the d-phase) at the exciting current switching. Accordingly, the variation is considerably suppressible, as compared with the torque variation waveform (FIG. 2) due to the current variation in the conventional FET drive method.

Moreover, in the case of this embodiment 2, although difficulty is experienced in marking the rates of current change in the rising phase and the falling phase coincide completely with each other, as compared with FIG. 12 showing the effects of the above-described embodiment 1, the embodiment 2 provides an effect in that it is possible to shorten the current switching transient time (that is, the time to be taken from when the switching begins until the current becomes stable). Therefore, when the motor rotates at a high speed, the current-stable time between two current switching times becomes longer, which contributes to the reduction of the current variation and torque variation.

Embodiment 3

This embodiment relates to a combination of the aforesaid embodiment 1 and embodiment 2. That is, at the exciting current switching, both the rate of current change of the PWM signal for the falling phase (for example, the d-phase) and rate of current change for the rising phase (for example, the a-phase) are controlled to become equal to each other. In this case, the PWM signal duty ratio $Duty_{2-1}$ for the d-phase is selected from the following range by use of equation (20).

$$0 < Duty_{2-1} < 0.5 + Km \cdot \omega / 2Vb \tag{24}$$

Further, the PWM signal duty ratio $Duty_{2-2}$ for the a-phase is obtained as follows by use of equation (18), $$Duty_{2-2} = Duty1 - Duty_{2-1} + 0.5 + Km \cdot \omega / 2Vb \tag{25}$$

where if $Duty_{2-2} > 1$, $Duty_{2-2} = 1$.

Alternatively, the PWM signal duty ratio $Duty_{2-2}$ for the d-phase is selected from the following range by use of equation (21).

$$0 < Duty_{2-1} < Duty1 - 2i \cdot R / 2Vb \tag{26}$$

Further, the PWM signal duty ratio $Duty_{2-2}$ for the a-phase is obtained as follows by use of equation (19), $$Duty_{2-2} = 2Duty1 - Duty_{2-1} - 2i \cdot R / 2Vb \tag{27}$$

where if $Duty_{2-2} > 1$, $Duty_{2-2} = 1$.

In FIG. 16, (A) shows reverse electromotive voltage s Ea–e in the respective phases, and (B) shows rate-of-current-change control gate drive signals $G'_{PC}$ for a falling phase (the d-phase) and a rising phase (the a-phase), calculated in the functional block of FIG. 9. In FIG. 17, (C) illustrates upper and lower side FET gate drive signals $G''_{1-10}$ for the respective phases, calculated in the functional block of FIG. 8, and (D) illustrates the relationship in phase among the waveforms of the rotor position detection signals Sa–e. In this case, through the logical operation in FIG. 8, the gate drive signals $G''_{1-10}$ in (C) of FIG. 17 are produced on the basis of the rotor position detection signals Sa–e in (D) of FIG. 17 and an electromagnetic torque direction command DRCT, and the gate drive signals $G'_{1-10}$ are created from the drive signals $G''_{1-10}$ and the PWM signal with the duty ratio Duty1. In addition, through the logical operation in (A) of FIG. 9, the gate drive signals $G'_{PC}$ of the falling phase (the d phase) and the rising phase (a-phase) in (B) of FIG. 16 are created from the rotor position detection signals Sa–e in (D) of FIG. 17 and the electromagnetic torque direction command DRCT.

The gate drive signal $G'_{PC}$ becomes "Low" (0) or "High" (1) when the gate drive signal $G''_{1-10}$ in (C) of FIG. 17 is "High" (1) or "Low" (0). That is, when the gate drive signal $G''_{1-10}$ for this phase becomes "High" (the rise of current) or "Low" (the fall of current), the rise or fall of that current is controlled with another drive signal $G'_{PC}$. For instance, when the gate drive signals $G''_{1-10}$ for Td1, Ta1 in (C) of FIG. 17 become "Low" and "High", respectively, at an electrical angle of 18°, both the gate drive signals $G'_{PC}$ for Td1 and Ta1 in (B) of FIG. 16 become "High", and then the gate drive signal for Ta1 becomes "Low" instantaneously while the gate drive signal for Td1 becomes "Low" at an electrical angle of 54°. The gate drive signals $G_{PC}$ for the falling phase (the d-phase) and the rising phase (the a-phase) are produced from the gate drive signals $G'_{PC}$ and the PWM signal with the duty ratio Duty2. The actual FET gate drive signals $G_{1-10}$ are produced through the composite operation of the aforesaid gate drive signals $G'_{1-10}$ and $G_{PC}$.

Figure 18:
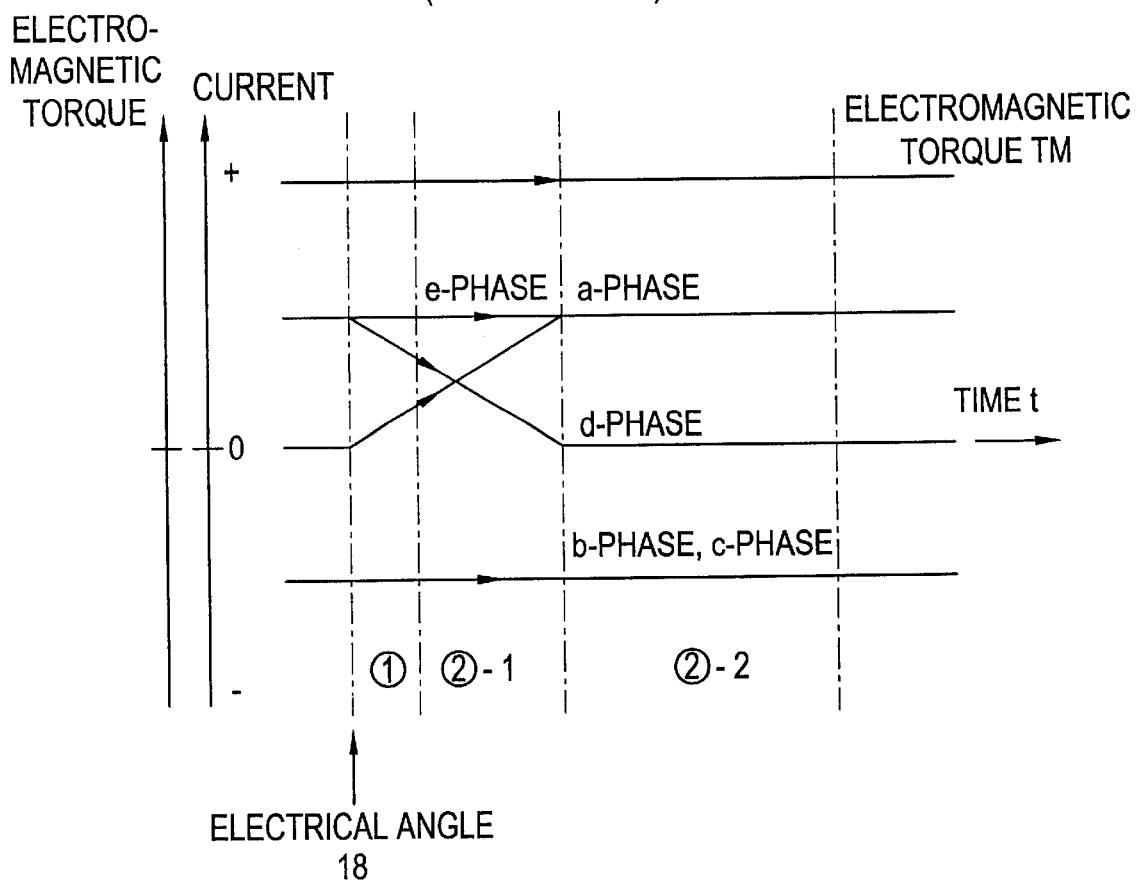
FIG. 18 is an illustration of a current variation in each phase at exciting current switching and an electromagnetic torque variation in the third embodiment.

By controlling both the rates of current change in the falling phase and the rising phase in this way, as shown in FIG. 18, between the start of the aforesaid interval indicated by ① and the middle (②–1) of the interval indicated by ②, the rates of current change in the falling phase (the d-phase) and the rising phase (the a-phase) at the exciting current switching can coincide with each other. Accordingly, the variation is considerably suppressible, as compared with the torque variation waveform (FIG. 2) due to the current variation in the conventional FET drive method.

Moreover, also in the case of this embodiment 3, although difficulty is experienced in making the rates of current change in the rising phase and the falling phase coincide completely with each other, as in the above-described embodiment 2, the embodiment 3 provides an effect in that it is possible to shorten the current switching transient time. Therefore, when the motor rotates at a high speed, the current-stable time between two current switching times becomes longer, which contributes to the reduction of the current variation and torque variation.

In the above-described embodiments, the respective FET gate drive signals $G'_{1-10}$ are determined on the basis of the first PWM signal duty ratio Duty1, the rotor position detection signals Sa–e and the direction command DRCT of the electromagnetic torque Tm. On the other hand, the second PWM signal duty ratio Duty2 for the phase to be switched is calculated for controlling the rate of change of a rising and/or falling current in the phase to be switched. This calculation is made by using the motor current value I, the first PWM signal duty ratio Duty1, the motor rotational angular velocity ω, the counter electromotive voltage constant Km of the motor, the power supply voltage Vb to be applied to the motor drive circuit and the function f of the resistance component R of the equivalent electric circuits of the motor and the drive circuit. Thus, the current value I of the motor is detected with the current detecting circuit 24, and the first PWM signal duty ratio Duty1 is obtained from the output of the current feedback control, and further a switching signal is produced from the rotor position detection signal Sa–e, and even the motor rotational angular velocity ω is detected. Further, through the logical operation of the FET drive start signals $G'_{PC}$ for a rising and or falling phases and the duty ratio Duty2, the FET drive control signal $G_{PC}$ is determined for the phase to be actually switched, and the drive of the motor is controlled in accordance with these gate drive signals $G'_{1-10}$ and $G_{PC}$.

Meanwhile, the control circuit in FIG. 5 sends, to the FET fate drive circuit 22, the gate signals Ga1 to Ge2 corresponding to the combination of the detection signals Sa–e from the rotor position detecting circuit 25 according to a predetermined gate setting table. In addition, the control circuit 21 produces a motor drive voltage command signal under current control on the basis of the aforesaid inputted signal and produces a pulse width modulation signal and a gate drive signal $G_{1-10}$ (=Ga1 to Ge2) to supply it to the FET gate drive circuit 22.

Description of OFF-Phase Residual Current

The PWM signal duty ratio (Duty2) for an OFF-phase (for example, the d-phase in FIG. 21) is expressed by the following equation.

$$\text{Duty2} = 0.5 + Km \cdot \omega / 2Vb \tag{28}$$

In this case, when the motor rotational speed is low, since Km·ω/2Vb≈0, the duty ratio Duty2≈0.5=50%.

Figure 20:
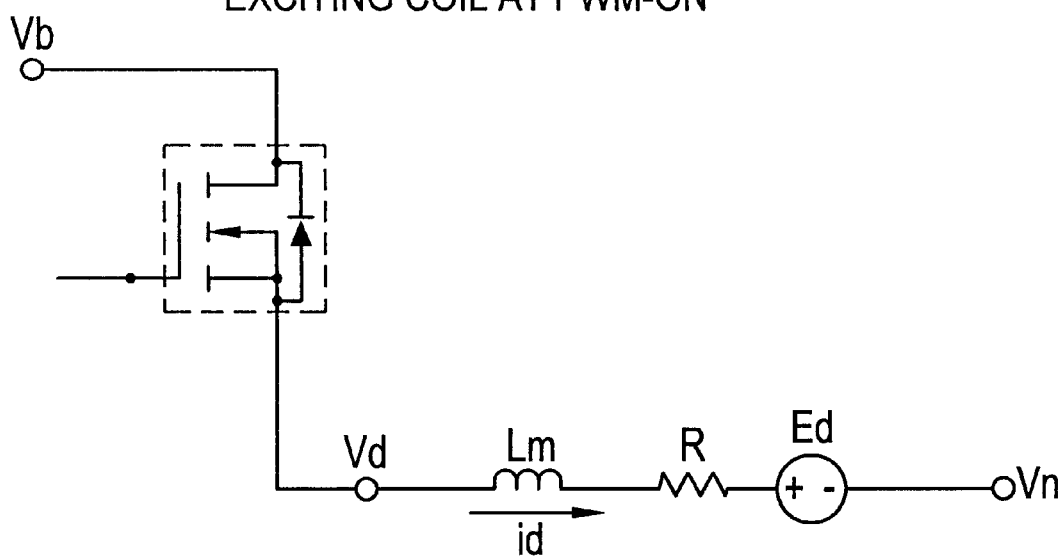
Figure 21:
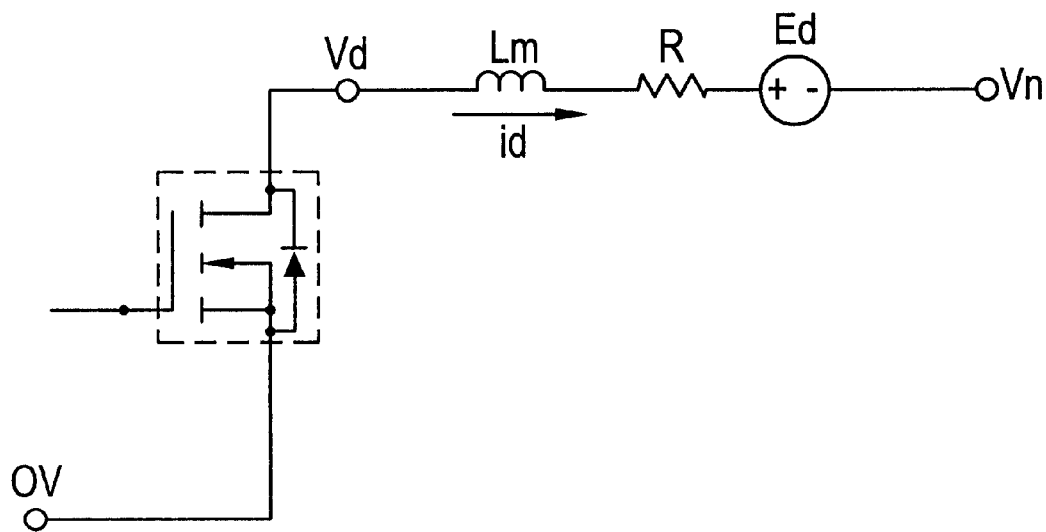
FIG. 21 is a circuit diagram showing an equivalent circuit of an OFF-phase exciting coil at PWM-OFF.

FIG. 20 is a circuit diagram showing an equivalent circuit of an OFF-phase exciting coil at PWM-ON, and FIG. 21 is a circuit diagram showing an equivalent circuit of an OFF-phase exciting coil at PWM-OFF. The voltage Vn at the central connection point of exciting coils for the respective phases (the junction of the respective phases) becomes approximately 0.5Vb. For instance, in the case in which the duty ratio (Duty2) in the PWM for an OFF-phase is at 50%, the direct-current line voltage Vb and "0" are alternately applied to a terminal d of the OFF-phase exciting coil. From the equivalent circuits shown in FIGS. 20 and 21, the motor rotational angular velocity ω is substantially "0", and when the voltage applied to the OFF-phase exciting coil is "Vd–Vn", the current $i_d$ flowing in the OFF-phase exciting coil becomes as shown in FIG. 22.

Figure 22:
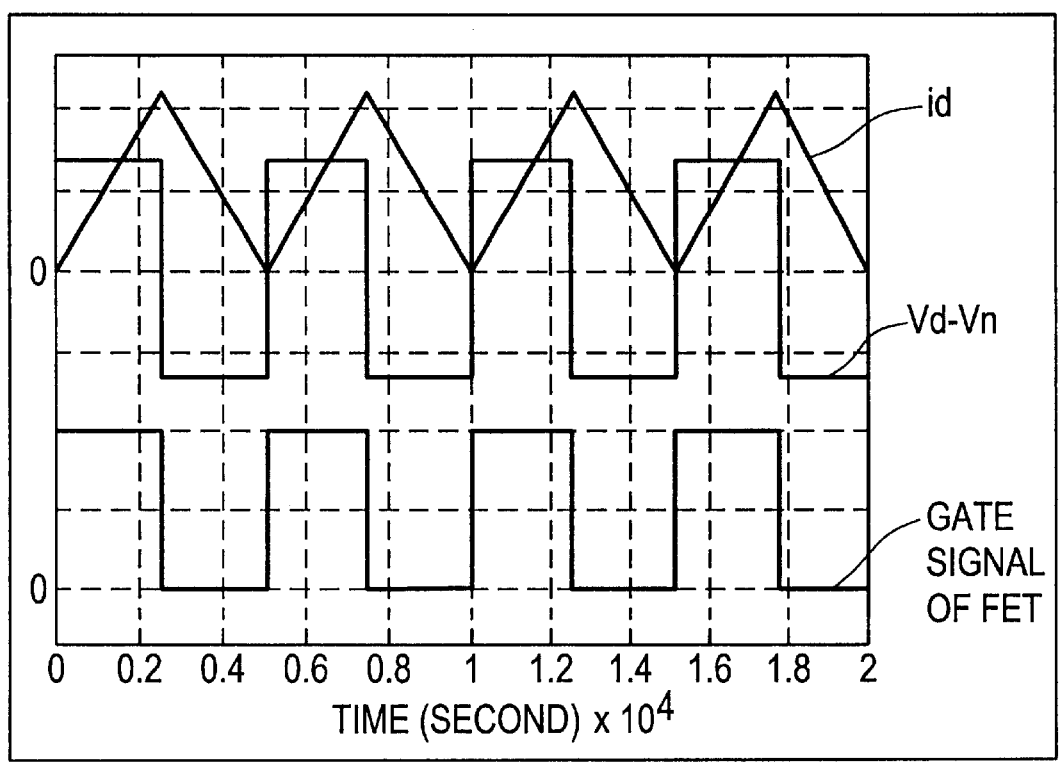
FIG. 22 is a characteristic diagram showing a PWM waveform, an applied voltage waveform and a residual current waveform in an OFF-phase exciting coil.

As FIG. 22 shows, the average value of the voltages (Vd–Vn) applied to the OFF-phase is "0", whereas the average value of the currents $i_d$ flowing in the OFF-phase exciting coil does not become "0". The magnitude of the average value of the OFF-phase currents $i_d$ (the average value of the residual currents) is in connection with the duty ratio Duty2 of the OFF-phase PWM, the resistance value of the equivalent circuit of the OFF-phase exciting coil, the electrical time constant of the OFF-phase exciting coil, the counter electromotive voltage of the OFF-phase exciting coil, the DC line voltage forming a power supply voltage to the pulse width modulation circuit, and others.

Occurrence of Rapid Torque Level Variation due to Residual Current

Figure 3:
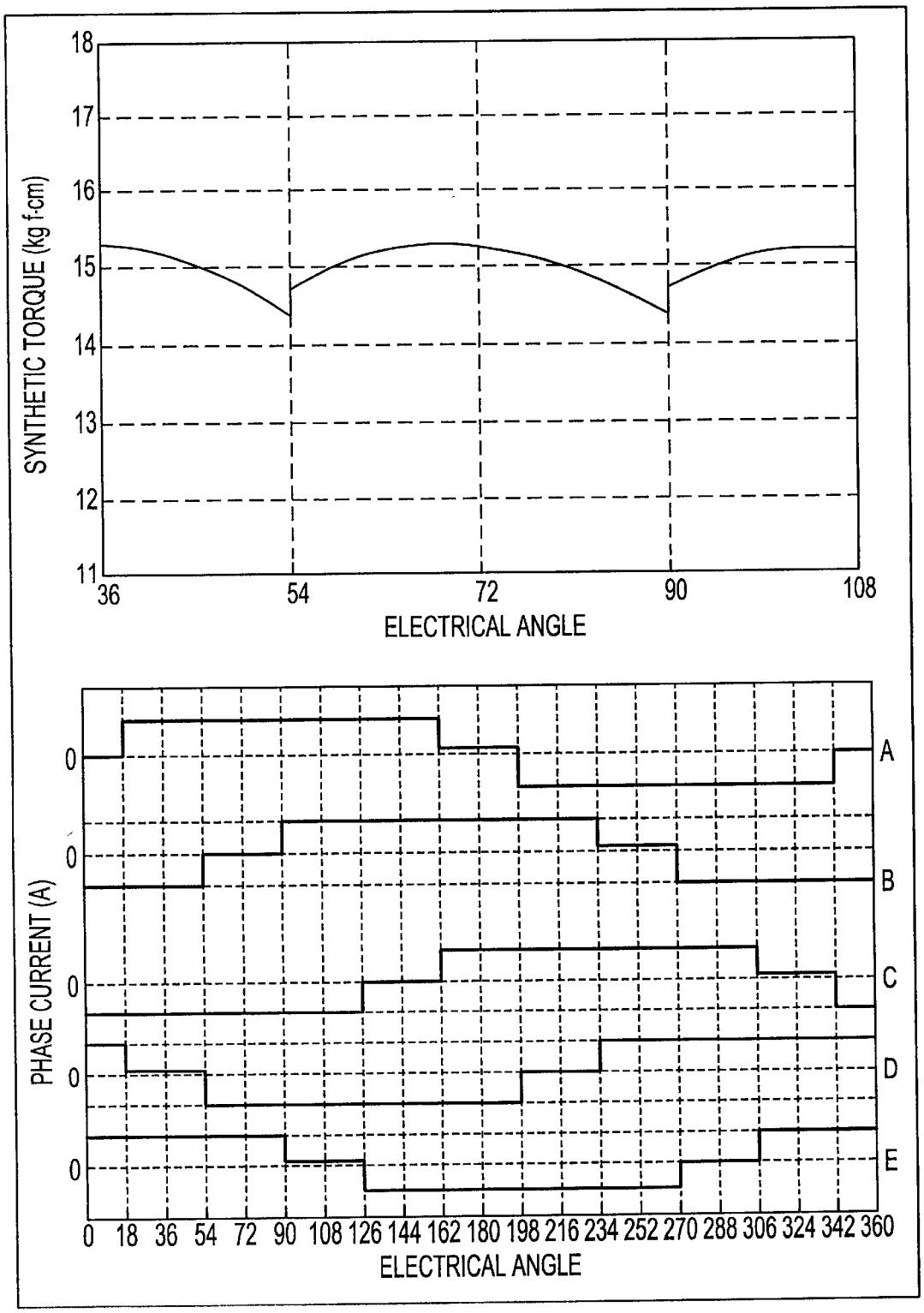
FIG. 3 is an illustration of a phase current waveform in each exciting coil and a torque waveform in a conventional brushless DC motor drive control system.
Figure 19:
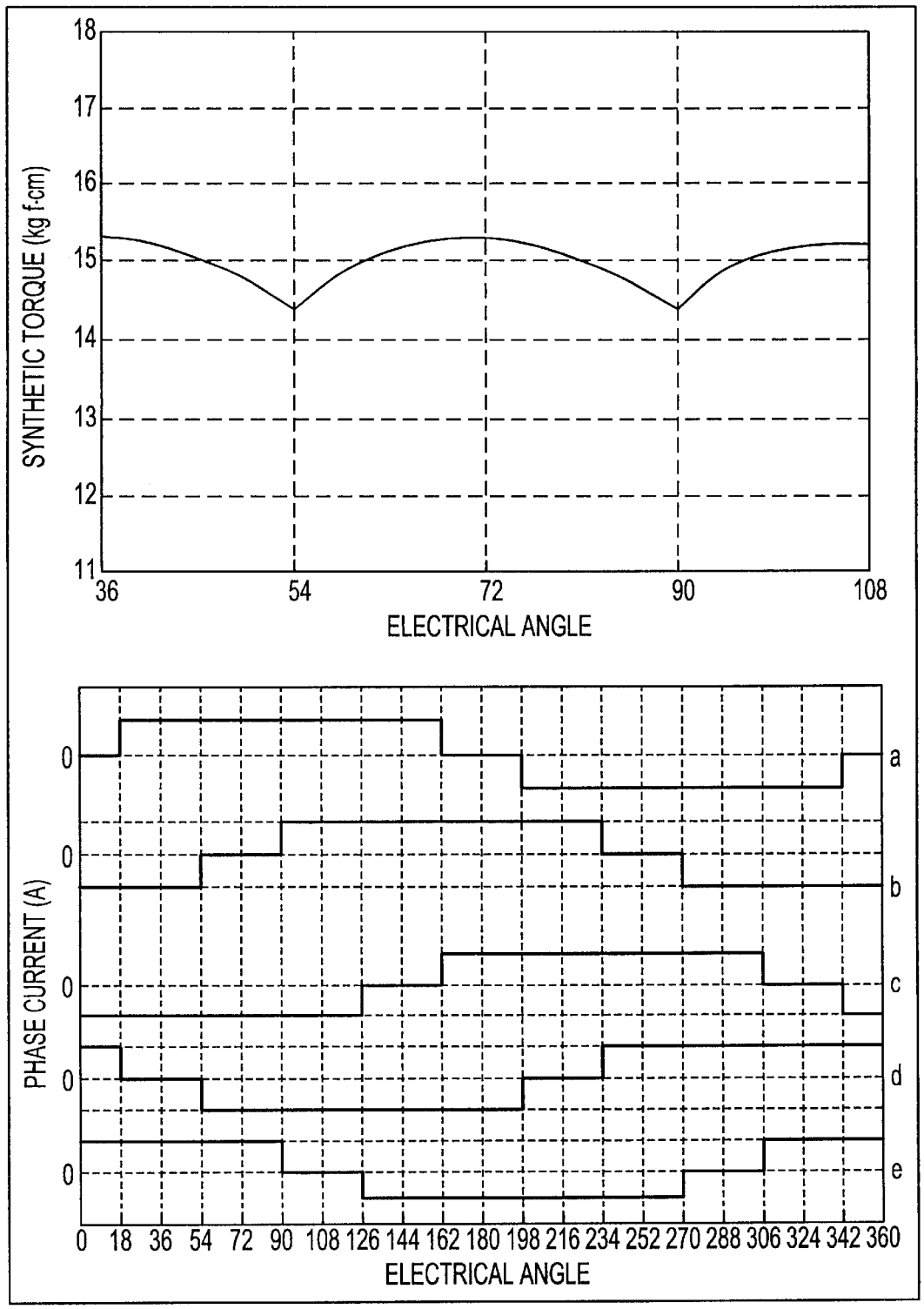
FIG. 19 is a characteristic diagram showing a phase current waveform in each exciting coil and a torque waveform in a brushless DC motor drive control system according to this embodiment.

FIG. 19 is a characteristics diagram showing a phase current waveform in each phase and a torque waveform in the case in which the average value of the currents $i_d$ flowing in the OFF-phase exciting coil (the average value of residual currents) becomes "0", that is, if the residual currents are disregarded. In this instance, even at the commutation position, the torque waveform becomes a continuous. In consideration of the residual currents, the phase current waveform in each exciting coil and the torque waveform become as shown in FIG. 3. In this case, due to the influence of the residual current, a rapid level variation occurs at the commutation position in the torque waveform.

Estimation of Time to be Taken Until OFF-Phase Current Reaches "0"

At the commutation of a brushless DC motor (for example, at the commutation of a phase current $i_d \geq i_a$ passing through the upper side FET in FIG. 5), the OFF-phase current $i_d$ is coupled through a diode to the ground of the DC line voltage Vb, and the central point voltage of the radiating connection becomes Vn (≈½·Vb) while the coil counter electromotive voltage becomes Ed. In the case in which the PWM frequency is sufficiently lower than the electrical time constant of the equivalent circuit of the OFF-phase coil, the voltage Vd to be applied to the terminal of the OFF-phase coil can be approximately expressed by the following equation.

$$Vd = Vb \cdot \text{Duty2} \tag{29}$$

Figure 23:
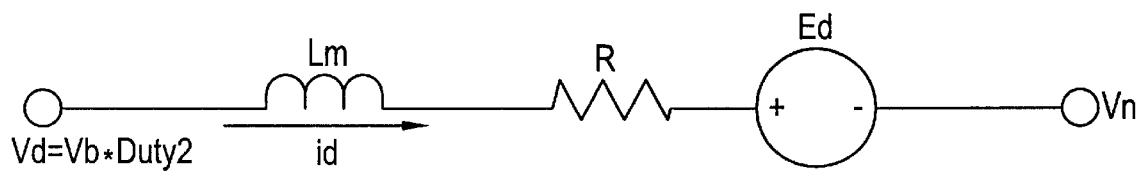
FIG. 23 is a circuit diagram showing an equivalent circuit of an OFF-phase exciting coil.

Thus, in the case in which the PWM frequency is sufficiently lower than the time constant of the equivalent circuit of the OFF-phase coil, the equivalent circuit of the OFF-phase exciting coil can be expressed with an equivalent circuit, shown in FIG. 23, which is a combination of FIG. 20 showing the OFF-phase equivalent circuit at the PWM-ON and FIG. 21 showing the equivalent circuit at the PWM-OFF. Accordingly, the sum of the voltages Voff applied to the OFF-phase exciting coil is given by the following equation (30).

$$\text{Voff} = Vd - Vn - Ed \tag{30}$$

The equation indicating the voltage Voff of the OFF-phase exciting coil can be the following equation (31), and the current $i_d(t)$ to the OFF-phase exciting coil can be expressed by the following equation (32).

$$\text{Voff} = Vd - Vn - Ed = Lm \cdot (di_d/dt) + i_d \cdot R \tag{31}$$

$$i_d(t) = (Id_c/2) \cdot e^{-t/T} + (\text{Voff}/R) \cdot (1 - e^{-t/T}) \tag{32}$$

In this case, the initial current $i_d(0)$ at the start of the commutation in the OFF-phase exciting coil=$Id_c/2$, and the electrical time constant of the OFF-phase exciting coil=Lm/R.

Owing to the equivalent voltage Voff of the OFF-phase exciting coil and the resistance of the equivalent circuit of the OFF-phase exciting coil, the coil current $i_d$ decreases up to $Id_c/2 \geq 0$, where $Id_c$ represents the sum of the exciting currents of the motor. In this case, Vd=Vb·Duty2, Vn=0.5Vb, Ed=Km·ω/2. The time needed until the current $i_d(t)$ in the OFF phase exciting coil decreases from $i_d(0)=Id_c/2$ to $i_d(t1) \approx 0$ depends upon the electrical time constant and resistance R of the equivalent circuit of the OFF-phase exciting coil, the PWM duty ratio Duty2 given to the OFF-phase exciting coil at the commutation, the motor counter electromotive voltage Ed, the DC line voltage Vb, the initial current value $i_d(0)$ at the commutation, and others.

According to the aforesaid equation (28) expressing the PWM signal duty ratio Duty2, in the case of Duty2=0.5+Km·ω/2Vb, the voltage Vb to be applied to the coil terminal d=0.5·Vb+Km·ω/2. Accordingly, the voltage Voff to be applied to the OFF-phase exciting coil becomes "0", and the current $i_d(t)$ in the OFF-phase exciting coil is as expressed by the following equation (33).

$$i_d(t)=Id_c/2 \cdot e^{-t/T} \tag{33}$$

In this case, the initial current $i_d(0)=Id_c/2$ and the electrical time constant T=Lm/R.

Through the use of the aforesaid equation (33), the time needed until the current $i_d(t)$ to the OFF-phase exciting coil decreases to n[%] of the initial current $i_d(0)$ at the start of the commutation is obtained according to the following equation (34).

$$t=-T \cdot \ln(n\%) \tag{34}$$

For instance, the time to be taken for the reduction to 5% of the initial current $i_d(0)$ to the OFF-phase exciting coil at the beginning of the commutation is approximately three times the electrical time constant (T=Lm/R) of the OFF-phase equivalent circuit.

Limitation on Energizing Time for OFF-Phase

When the rotational speed of the brushless DC motor is low, the OFF-phase exciting coil is driven with a PWM after the beginning of the commutation, and the current supply to the OFF-phase by the PWM is completely shut off before the beginning of the next commutation. That is, the energizing period forming the time period for which the OFF-phase exciting coil is driven with the PWM is determined on the basis of the electrical time constant T and resistance R of the equivalent circuit of the OFF-phase exciting coil, the duty ratio Duty2 of the PWM given to the OFF-phase exciting coil at the commutation, the motor counter electromotive voltage Ed, the DC line voltage Vb, the initial current $i_d(0)$ in the OFF-phase exciting coil at the beginning of the commutation, and others, while the current supply to the OFF-phase by the PWM is completely shut off for other than that energizing period. Thus, the residual current in the OFF-phase exciting coil becomes "0", and the torque waveform of the brushless DC motor assumes a continuous waveform with no rapid level variation, as shown in FIG. 19. Accordingly, with the brushless DC motor drive control system according to this embodiment, since a rapid torque level variation also does not occur at low-speed rotation, it is possible to reduce vibration and noise during motor rotation as compared with conventional brushless DC motor drive control systems.

According to the present invention, since the time period (energizing period) for which a drive current according to a pulse width modulation is supplied for the OFF-phase is limited to reduce the residual current in the OFF-phase of the commutation phases of the excitation coils of the brushless DC motor up to "0", the OFF-phase residual current is reducible to "0", thus providing a brushless DC motor drive control system capable of suppressing rapid torque level variation. In addition, if the brushless DC motor drive control system according to the present invention is employed as a power source for the electrically driven power steering, since the rapid torque variation in the brushless DC motor is slight, it is possible to improve the steering feel of the electrically driven power steering and to lessen vibration and noise.

Meanwhile, in the case in which both the upper and lower sides are driven with the same PWM, the setting may be made so that the PWM duty ratio Duty1 for the upper side=the PWM duty ratio Duty3 for the lower side. Further, in the case in which both the upper and lower sides are driven with the same PWM, in the motor drive circuit, a control means is provided to determine the direction of the exciting current to be supplied to each of the excitation phases of the motor and to control the ON/OFF switching. The control means makes the rates of current change for the two phases undergoing the switching coincide with each other (or makes them substantially equal to each other) in a manner of controlling the rate of change of the excitation current to be switched at that switching time. Thus, the current variation in the phase not undergoing the switching is suppressed, so that it is possible to restrain the transient torque variation with a simple circuit. On the other hand, in the case in which the positive side drive duty ratio and the negative side drive duty ratio are different from each other in the exciting current waveform shown in FIG. 1, although the transient torque variation occurs due to the current variation, this embodiment eliminates it according to the following method.

Method for Obtaining Equations for Commutation Phase Drive Duty Ratios (Duty2, Duty4) for Holding the Sum Total of Motor Currents Constant at Commutation When Upper and Lower Sides are Driven with Different Duty Ratios (Duty1, Duty3)

A description will be given hereinbelow of a method for obtaining the duty ratio Duty2 when upper side commutation (the upper side assumes the d-phase and the e-phase, while the lower side assumes the b-phase and the c-phase, and the commutation takes place from the d-phase to the a-phase). An equation for the duty ratio Duty4 for the lower side commutation is obtainable with the same method as that for the upper side commutation. As an example of the upper and lower side PWM drive duty ratios being different from each other, there is taken a case in which the lower side drive duty ratio Duty3≧the upper side drive duty Duty1. Even in the converse case (Duty3≦Duty1), the duty ratio Duty2 is obtainable with the same method. The falling phase drive duty ratio at the upper side commutation is Duty2. In this case, in order to easily obtain the equation, in the description the rising phase drive duty ratio is set at Duty1, and Duty3≧Duty1≧Duty2.

Figure 24:
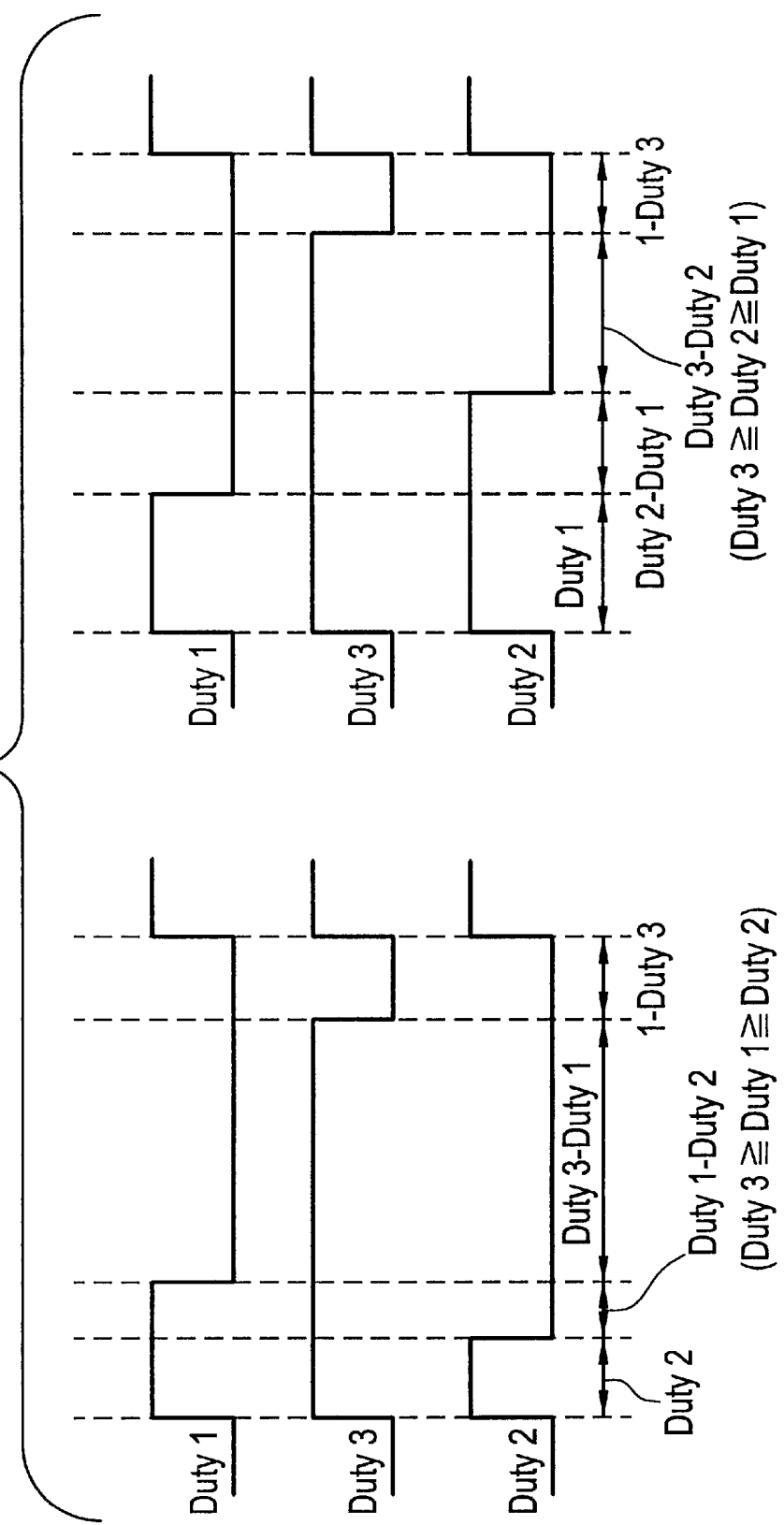
FIG. 24 is a waveform diagram showing 3 PWM signals different in duty ratio from each other.

FIG. 24 is an illustration of waveforms of excitation currents of the motor, showing three PWM signal duty ratios: Duty1, Duty3 and Duty2. An equation for a voltage vn at a central point of the motor coils is first obtained, and then an equation for each coil voltage is obtained using the central point voltage. Applied voltages to the respective coils in the voltage equation are expressed by PWM duty ratios Duty3, Duty1 and Duty2. Lastly, in order to hold the sum total of the motor currents constant, an equation for the duty ratio Duty2 for the commutation phase is obtained on the basis of the voltage equation for each phase where an applied voltage is expressed by a duty ratio.

1. Method of Obtaining an Equation for a Motor Central Point Voltage Vn

The three PWM signals shown in FIG. 24 are classified into 4 patterns. The motor central point voltage Vn is obtained as follows in the four PWM ON-OFF energizing patterns.

(a) When the PWMs with Duty1, Duty3 and Duty2 are in an ON-state

Figure 25:
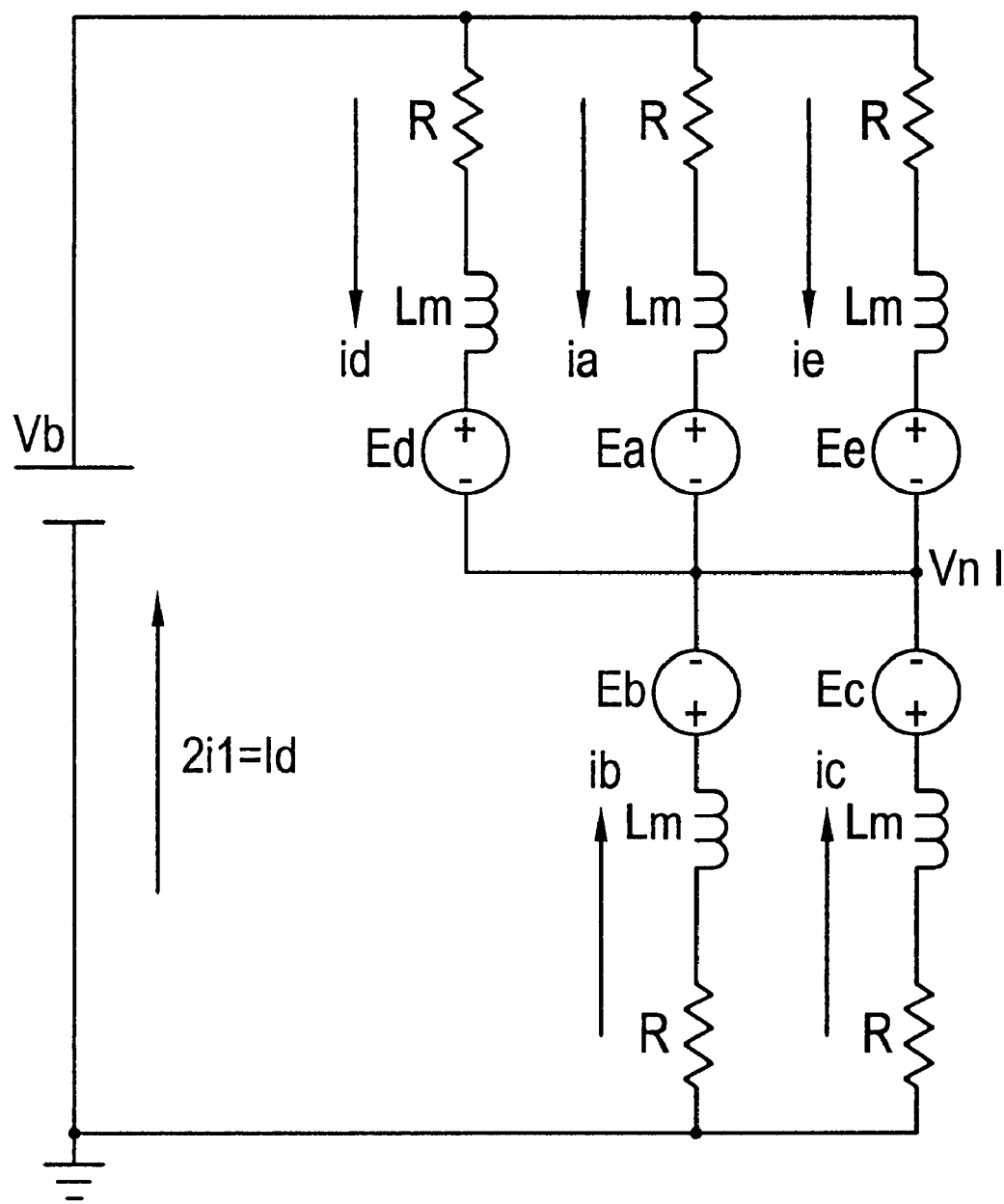
FIG. 25 is a circuit diagram showing an equivalent circuit on a brushless motor drive circuit in which PWMs of Duty1, Duty3 and Duty2 are in an ON-condition.

FIG. 25 is a circuit diagram showing an equivalent circuit of the brushless motor drive circuit in FIG. 5 in this state. From FIG. 25, the voltage equations for the respective coils yield the following equations (35) to (39).

$$Vb-v_{n1}=Lm(di_a/dt)+R_a i_a+E_a \tag{35}$$

$$Vb-v_{n1}=Lm(di_e/dt)+R_e i_e+E_e \tag{36}$$

$$Vb-v_{n1}=Lm(di_d/dt)+R_d i_d+E_d \tag{37}$$

$$-v_{n1}=Lm(di_b/dt)+R_b i_b+E_b \tag{38}$$

$$-v_{n1}=Lm(di_c/dt)+R_c i_c+E_c \tag{39}$$

Furthermore, the relationship between the DC line current $(2i_1)$ and the currents $(i_a, i_b, i_c, i_d, i_e)$ for the respective phases is given by the following equation (40).

$$2i_1=i_d+i_a+i_e=-(i_b+i_c) \tag{40}$$

Since the drive is made with a rectangular wave current and an excitation waveform is a substantially trapezoidal waveform of an electrical angle of 144°, the counter electromotive voltage approximately forms a trapezoidal wave. The absolute values of the counter electromotive voltage in the respective phases at the phase switching become substantially equal to each other. That is, they take on a state indicated by the following equation (41).

$$E_a=E_d=E_e=-E_b=-E_c=E \tag{41}$$

In addition, the coil resistances in the respective coils come to the same value. That is, its state is as indicated by the following equation (42).

$$R_a=R_d=R_e=R_b=R_c=R \tag{42}$$

The following equation (43) is obtained by adding the equations (35) to (37) and substituting the equations (40) to (42).

$$3V_b-3v_{n1}=Lm(d(2i_1)/dt)+R(2i_1)+3E \tag{43}$$

Furthermore, the following equation (44) is obtained by adding the equations (38) to (39) and substituting the equations (40) to (42).

$$-2v_{n1}=Lm(d(2i_1)/dt)-R(2i_1)-3E \tag{44}$$

The following equation (45) is obtained from the aforesaid equations (43) and (44), where the coil central voltage Vn1 is given with Vb and E.

$$v_{n1}=3/5 \cdot V_b-1/5 \cdot E \tag{45}$$

Figure 26:
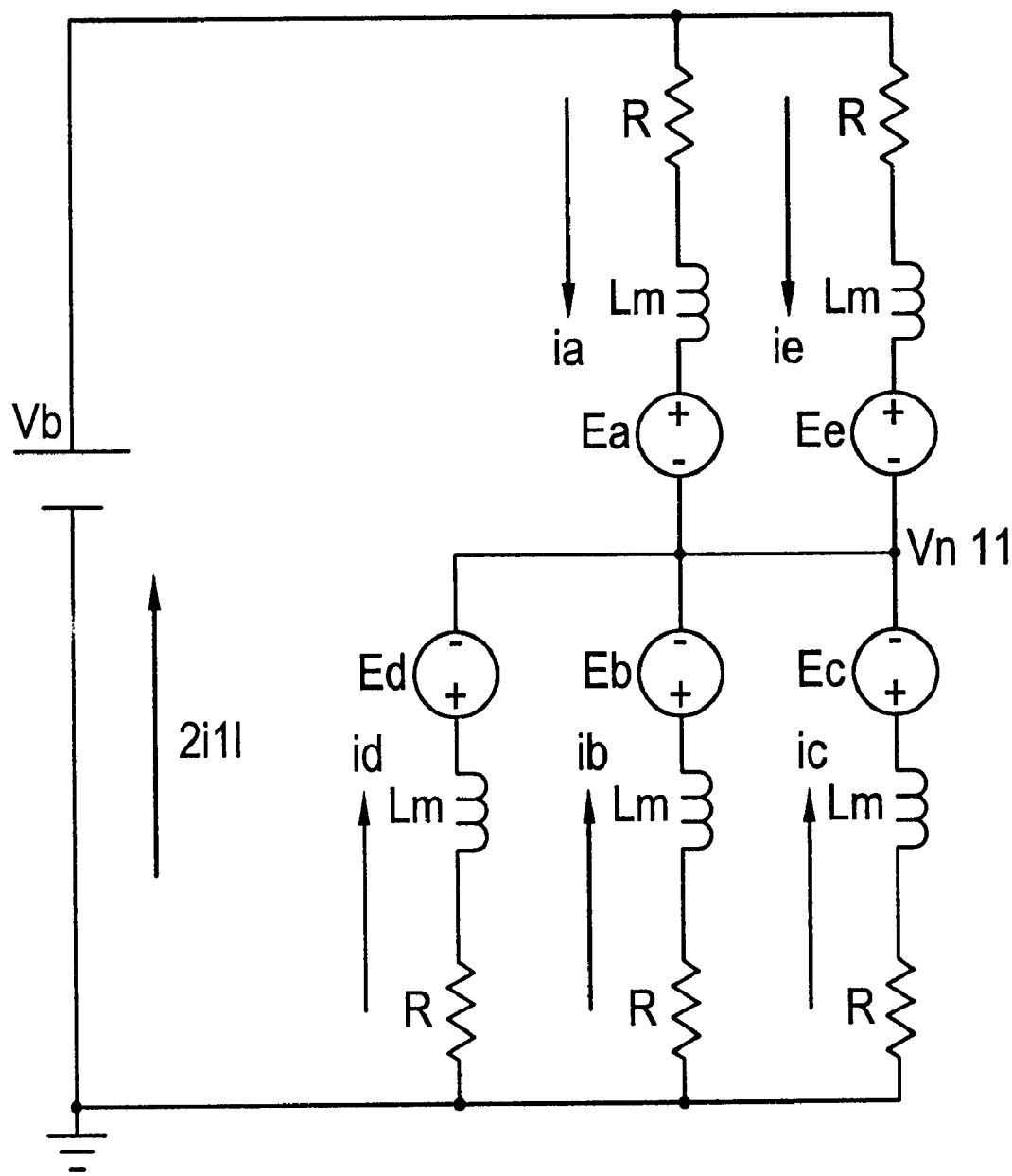
FIG. 26 is a circuit diagram showing an equivalent circuit on a brushless motor drive circuit in which PWM of Duty2 is in an OFF-condition while PWMs of Duty1 and Duty3 are in an ON-condition.

(b) When a PWM with Duty2 is in an OFF-state and PWMs with Duty1 and Duty3 are in an ON-state FIG. 26 is a circuit diagram showing an equivalent. circuit of the brushless motor drive circuit of FIG. 5 in this state.

From FIG. 26, the voltage equations for the respective coils yield the following equations (46) to (50).

$$V_b-v_{n11}=Lm(di_a/dt)+R_a i_a+E_a \tag{46}$$

$$V_b-v_{n11}=Lm(di_c/dt)+R_c i_c+E_c \tag{47}$$

$$-v_{n11}=Lm(di_d/dt)+R_d i_d+E_d \tag{48}$$

$$-v_{n11}=Lm(di_b/dt)+R_b i_b+E_b \tag{49}$$

$$-v_{n11}=Lm(di_c/dt)+R_c i_c+E_c \tag{50}$$

Furthermore, the relationship between the DC line current $(2i_{11})$ in the drive circuit and the currents $(i_a, i_b, i_c, i_d, i_e)$ for the respective phases is given by the following equation (51).

$$2i_{11}=i_a+i_e=-(i_d+i_b+i_c) \tag{51}$$

In the aforesaid equations (46) to (51), (41) and (42), if the terms pertaining to the currents are removed and the coil center voltage $V_{n11}$ is expressed with Vb and E, the following equation (52) is obtained.

$$v_{n11}=2/5 \cdot V_b-1/5 \cdot E \tag{52}$$

Figure 27:
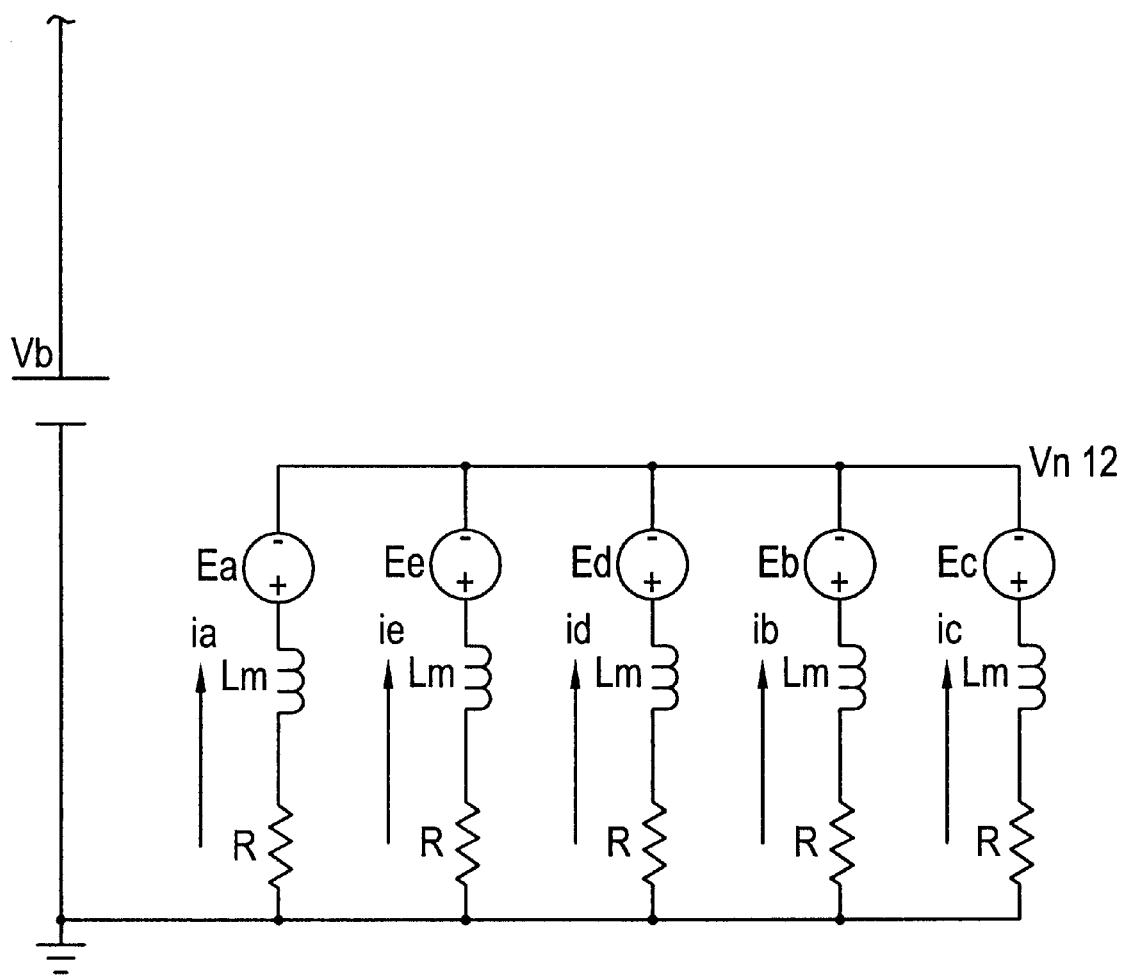
FIG. 27 is a circuit diagram showing an equivalent circuit on a brushless motor drive circuit in which PWMs of Duty1 and Duty2 are in an OFF-condition while PWM of Duty3 is in an ON-condition.

(c) When PWMs with Duty1 and Duty2 are in an OFF-state and a PWM with Duty3 is in an ON-state FIG. 27 is a circuit diagram showing an equivalent circuit of the brushless motor drive circuit of FIG. 5 in this state. From FIG. 27, the voltage equations for the respective coils form the following equations (53) to (57).

$$-v_{n12}=Lm(di_a/dt)+R_a i_a+E_a \tag{53}$$

$$-v_{n12}=Lm(di_e/dt)+R_e i_e+E_e \tag{54}$$

$$-v_{n12}=Lm(di_d/dt)+R_d i_d+E_d \tag{55}$$

$$-v_{n12}=Lm(di_b/dt)+R_b i_b+E_b \tag{56}$$

$$-v_{n12}=Lm(di_c/dt)+R_c i_c+E_c \tag{57}$$

Furthermore, the relationship between the DC line current $(2i_{12})$ in the drive circuit and the currents $(i_a, i_b, i_c, i_d, i_e)$ for the respective phases is given by the following equation (58).

$$2i_{12}=i_a+i_e=-(i_d+i_b+i_c) \tag{58}$$

In the aforesaid equations (53) to (58), (41) and (42), if the terms pertaining to the currents are removed and the coil center voltage $V_{n12}$ is expressed with Vb and E, the following equation (59) is obtained.

$$v_{n12}=-1/5 \cdot E \tag{52}$$

(d) When PWMs with Duty1, Duty2 and Duty3 are in an OFF-state

Figure 28:
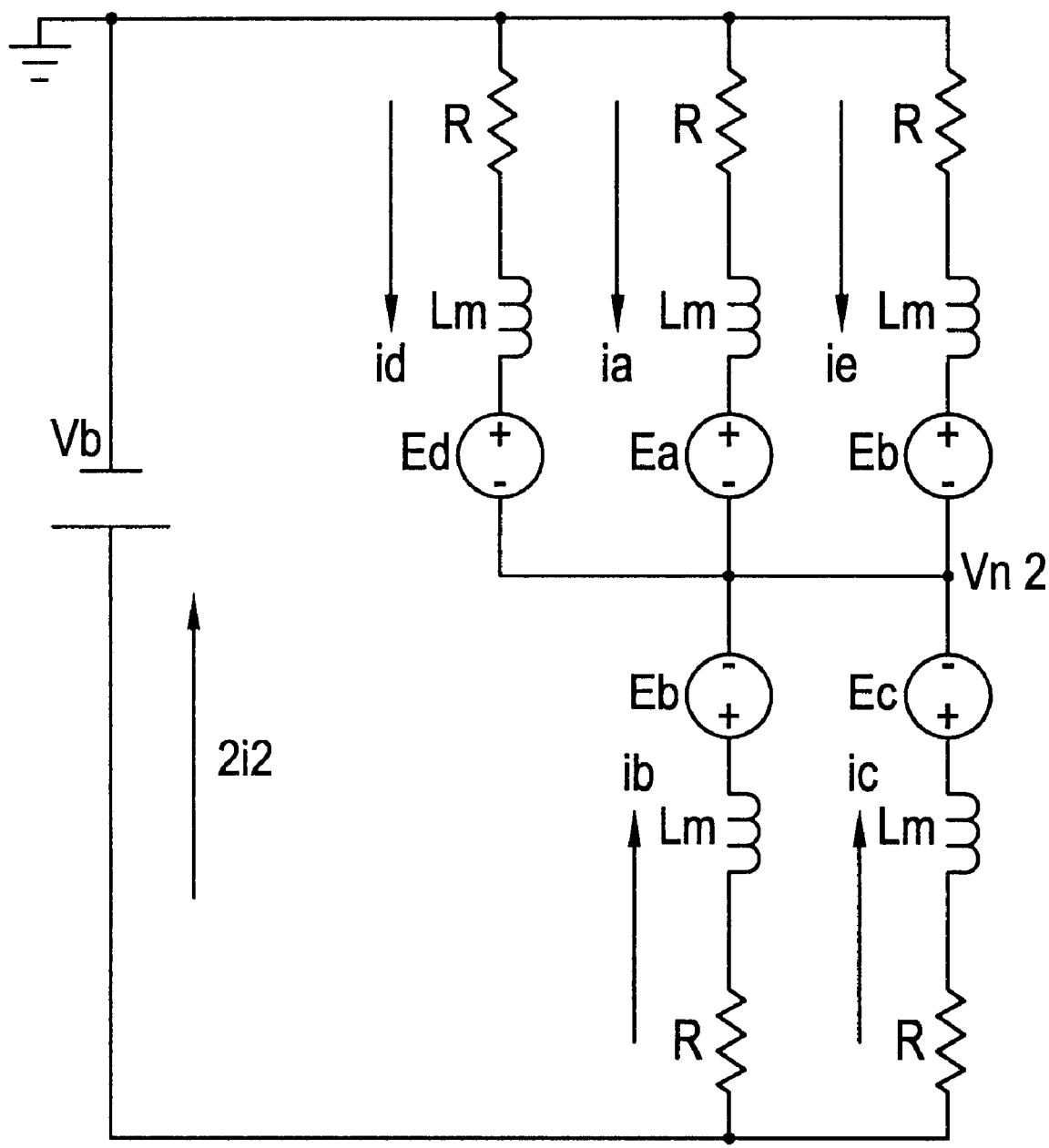
FIG. 28 is a circuit diagram showing an equivalent circuit on a brushless motor drive circuit in which PWMs of Duty1, Duty3 and Duty2 are in an OFF-condition.

FIG. 28 is a circuit diagram showing an equivalent circuit of the brushless motor drive circuit of FIG. 5 in this state. From FIG. 28, the voltage equations for the respective coils yield the following equations (60) to (64).

$$-v_{n2}=Lm(di_a/dt)+R_a i_a+E_a \tag{60}$$

$$-v_{n2}=Lm(di_e/dt)+R_e i_e+E_e \tag{61}$$

$$-v_{n2}=Lm(di_d/dt)+R_d i_d+E_d \tag{62}$$

$$Vb-v_{n2}=Lm(di_b/dt)+R_b i_b+E_b \tag{63}$$

$$Vb-v_{n2}=Lm(di_c/dt)+R_c i_c+E_c \tag{64}$$

Furthermore, the relationship between the DC line current ($2i_2$) in the drive circuit and the currents ($i_a$, $i_b$, $i_c$, $i_d$, $i_e$) for the respective phases is given by the following equation (65).

$$2i_2 = i_d + i_a + i_e = -(i_b + i_c) \tag{65}$$

In the aforesaid equations (60) to (65), (41) and (42), if the terms pertaining to the currents are removed and the coil center voltage $V_{n2}$ is expressed with Vb and E, the following equation (66) is obtained.

$$V_{n2} = 2/5 \cdot V_b - 1/5 \cdot E \tag{66}$$

2. Method of Obtaining Voltage Equations for the Respective Phases where an Applied Voltage is Expressed by a Duty.

As seen from the aforesaid equations (45), (52), (59) and (66) indicating the coil center voltages Vn and the process of obtaining these equations, the coil center voltage and the terminal voltage vary by the four PWM ON-OFF energizing patterns shown in FIG. 24. That variation frequency is approximately the frequency of the PWM. Since the period of the PWM is sufficiently lower than the electrical time constant of the equivalent circuit of the motor coil, the terminal voltage and center voltage of the coil can properly be expressed with the average value of the voltages during one period of the PWM.

A description will be made of an example in which the applied voltage in the voltage equation for the a phase of the upper side a- and e-phase coils is expressed with the average value. The duty ratios in the four PWM ON-OFF energizing patterns shown in FIG. 24 are as follows.

a) Duty2
b) (Duty1−Duty2)
c) (Duty3−Duty1)
d) (1−Duty3)

From the applied voltage terms on the left sides of the a-phase voltage equations (the equations (35), (46), 53), (60)) in the respective patterns where the duty ratios in the respective energizing patterns are multiplied, the applied voltages in the periods of the respective patterns are given as follows.

a) Duty2(Vb−$V_{n1}$)
b) (Duty1−Duty2)·(Vb−$V_{n1}$)
c) (Duty3−Duty1)·−$V_{n12}$
d) (1−Duty3)·−$V_{n2}$ The sum of these 4 applied voltages a), b), c) and d) is the average applied voltage (Va−Vn) in the PWM period as indicated by the following equation (67).

$$v_a - v_n = \text{Duty1} \cdot Vb - \text{Duty2} \cdot (v_{n1} - v_{n11}) - \text{Duty1} \cdot (v_{n11} - v_{n12}) - \text{Duty3} \cdot (v_{n12} - v_{n2}) - V_{n2} \tag{67}$$

If the respective center voltages ($V_{n1}$, $V_{n11}$, $V_{n12}$, $V_{n2}$) are substituted into the aforesaid equations (45), (52), (59) and (66), the average value of the applied voltages can be expressed with a duty ratio nd Vb, E. The a-phase voltage equation is the following equation (68) and, similarly, the e-phase voltage equation is the following equation (69).

$$v_a - v_n = Lm(di_a/dt) + R_a i_a + E_a \tag{68}$$

$$v_e - v_n = Lm(di_e/dt) + R_e i_e + E_e \tag{69}$$

However, the average voltage values $v_a$ and $v_e$ at the upper side coil terminals and the average value $v_n$ of the coil center voltages are given by the following equations (70) and (71).

$$v_a = v_e = \text{Duty1} \cdot Vb \tag{70}$$

$$v_n = (2+\text{Duty2}) \cdot 1/5 \cdot Vb - 1/5 \cdot E - (\text{Duty3} - \text{Duty1}) \cdot 2/5 \cdot V \tag{71}$$

The voltage equations for the OFF-phase coil (d-phase) and the lower side coils (b-phase and c-phase) can be obtained in the same manner as for obtaining the aforesaid upper side coil voltage equations. The OFF-phase voltage equation is the following equation (72), while the upper side coil equations are the following equations (73) and (74).

$$v_d - v_n = Lm(di_d/dt) + R_d i_d + E_d \tag{72}$$

$$v_b - v_n = Lm(di_b/dt) + R_b i_b + E_b \tag{73}$$

$$v_c - v_n = Lm(di_c/dt) + R_c i_c + E_c \tag{74}$$

However, the average value vd of the OFF-phase terminal voltages and the average values vb and vc of the voltages at the lower side coil terminals are given by the following equations (75) and (76), respectively.

$$v_d = \text{Duty2} \cdot Vb \tag{75}$$

$$v_b = v_c = (1 - \text{Duty3}) \cdot Vb \tag{76}$$

The duty ratios Duty2 for two commutation phases (falling d-phase and rising a-phase) are taken as $\text{Duty2}_1$ and $\text{Duty2}_2$, and in the case that the setting is made as a more common state, the average coil terminal voltage values $v_a$ and $v_d$ in the falling (OFF) phase and the rising phase are given by the following equations (77) and (78). Although the aforesaid equation (71) indicating the center voltage also varies, the equation indicating the varied center voltage and the description thereof will be omitted.

$$v_d = \text{Duty2}\_1 \cdot Vb \quad v_e = \text{Duty1} \cdot Vb \tag{77}$$

$$v_a = \text{Duty2}\_2 \cdot Vb \tag{78}$$

3. Method of Obtaining an Equation for a Duty Ratio Duty2 for a Commutation Phase in Order to Maintain the Sum of Motor Currents Constant The voltage equation for each phase in which the aforesaid applied voltage is expressed with a duty ratio is made on the premise that the period of the PWM is sufficiently lower than the electrical time constant of the equivalent circuit of the coil. Accordingly, the current and voltage in the equations (68) to (76) are treated as the average values within the PWM period. At the upper side commutation (for example, from the d-phase to the a-phase), the sum of the upper side phase currents ($i_a$, $i_e$, $i_d$) becomes equal to the sum of the lower side phase currents ($i_b$, $i_c$) as seen from the following equation (79), $$i_a + i_e + i_d = -(i_b + i_c) = I = 2i \tag{79}$$

where I depicts a motor current which is detected by the current detecting means. Because each coil is handled as an object, assuming that the currents in the d- and e-phases of the upper side coils assume the same value at the beginning of the commutation (t=0), the a-phase current becomes "0".

$$i_e(0) = i_d(0) = 1/2 \cdot I(0)$$

$$i_a(0) = 0$$

Assuming that the rates of change of the rising and falling currents in two phases taking the commutation condition are the same as indicated by the following equation (80), the integration of the equation (80) makes the sum total of the currents $i_a(t)$ and $i_d(t)$ at an arbitrary time within the commutation period as expressed by the following equation (81).

$$di_a(t)/dt = -di_d(t)/dt \tag{80}$$

$$i_a(t)+i_d(t)=i_a(0)+i_d(0)=i_d(0)=1/2 \cdot I(0) \tag{81}$$

As seen from the aforesaid equation (81), if the rates of change of currents in two phases to be commutated within the commutation period are equalized, the sum total of the two phase currents is maintained constant. Accordingly, if the current $i_e(t)$ for an upper side phase, which is not commutated during the commutation period, does not vary, $i_e(t)=i_e(0)=1/2 \cdot I(0)$, and from the equation (79), the motor sum current $I(t)=i_a(t)+i_e(t)+i_d(t)=I(0)$ is maintained constant, and the motor electromagnetic torque is also maintained constant. Thus, the following equations (82) and (83) are satisfied during the commutation period.

$$i_a+i_d=i_e=1/2 \cdot I(0)=1/2 \cdot I=i \tag{82}$$

$$di_a/dt+di_d/dt=di_e/dt=0 \tag{83}$$

For obtaining the duty ratio Duty2 for a commutation phase when the motor sum current is maintained constant, both sides of the equations (68) and (72) being the voltage equations for two phases to be commutated are added and the equations (41), (42), (82) and (83) are substituted thereinto, thereby providing the following equation (84).

$$v_a+v_d-2v_n=Ri+2E \tag{84}$$

If the equations (41), (42), (82) and (83) are substituted into the equation (69), the voltage equation for an upper side phase not being in the commutation condition, then the following equation (85) is given.

$$v_e-v_n=Ri+E \tag{85}$$

In a manner so that the Ri terms are removed from the equations (84) and (85) and the equations (70), (71) and (75) are substituted thereinto, the commutation phase duty ratio Duty2 can be obtained on the basis of a counter electromotive voltage E (or a motor rotational angular velocity ω), a voltage Vb to be supplied to the drive circuit and the upper and lower side duty ratios Duty1, Duty3 as indicated by the following equation (86).

$$Duty2 = 0.5 + E/Vb - 0.5(Duty3 - Duty1) \tag{86}$$
$$= 0.5 + Km \cdot \omega/2Vb - 0.5(Duty3 - Duty1)$$

By eliminating $v_n$ and E terms from the equations (84) and (85) and substituting the equations (70) and (75) thereinto, the commutation phase duty ratio Duty2 is obtainable from a motor current I, a resistance R of an equivalent circuit of a motor coil, an FET and others, a voltage Vb to be given to the drive circuit and an upper side duty ratio Duty1 as indicated by the following equation (87).

$$Duty2=Duty1-Ri/Vb=Duty1-RI/2Vb \tag{87}$$

The duty ratios Duty2 for 2 commutation phases (falling d-phase and rising a-phase) are taken as $Duty2_1$ and $Duty2_2$, and in the case in which the setting is made to a more common state, the equations (77) and (78) and a new equation for the center voltage $v_n$ are substituted in place of the equations (70), (71) and (72), so that the commutation phase duty ratios Duty2 are obtained as indicated by the following equations (88) and (89).

$$Duty2\_1 + Duty2\_2 = Duty1 + E/Vb + vn/Vb \tag{88}$$
$$= Duty1 + Km \cdot \omega/2Vb + vn/Vb$$

$$Duty2\_1 + Duty2\_2 = 2Duty1 - Ri/Vb \tag{89}$$
$$= 2Duty1 - RI/2Vb$$

4. Method of Obtaining a Commutation Phase Duty Ratio Duty4 for Holding the Sum Total of Motor Currents at Lower Side Commutation As well as the equation obtaining method at the upper side commutation, an equation for a motor center voltage $v_n$ in each of PWM ON/OFF energizing state patterns is obtained, and a voltage equation for each phase in which an applied voltage is expressed with a duty ratio is obtained through that equation. Lastly, in order to hold the sum total of motor currents constant, the commutation phase duty ratio Duty4 is obtained. The result is the following equations (90) and (91).

$$Duty4 = 0.5 + E/Vb + 0.5(Duty3 - Duty1) \tag{90}$$
$$= 0.5 + Km \cdot \omega/2Vb + 0.5(Duty3 - Duty1)$$

$$Duty4 = Duty3 - Ri/Vb \tag{91}$$
$$= Duty3 - RI/2Vb$$

As described above, according to the present invention, in a system in which a motor is driven with rectangular waves through the use of one current detecting circuit, in the case in which the upper and lower side PWM drive duties are different from each other, the rates of change of currents for the rising phase and the falling phase are controlled at the phase switching, so that it is possible to provide a motor drive control system which is capable of maintaining the motor current constant at the phase switching and of suppressing the current variation and the electromagnetic torque variation, and which can realize a low-cost high-performance servo motor offering less current variation and less torque variation. In addition, if the motor drive control system according to the present invention is employed as a power source for electrically driven power steering, since less rapid torque variation occurs in the brushless DC motor, the steering feeling at the electrically driven power steering is improvable and vibration noise is reducible.

Although the above description has been made of the embodiments in which the present invention has been applied to the control of a five-phase brushless motor, the present invention is not limited to five phases, and when the number of phases is different, the rates of change of exciting currents for phases to be switched are controlled at the switching of the exciting currents as well as the above-described embodiments.

Industrial Applicability

In a motor drive control system according to the present invention, the rates of change of currents for a rising phase and a falling phase are controlled at the phase current switching, so that the motor current can be kept constant at the phase switching and the current variation and the electromagnetic torque variation are suppressible. Thus, if it is used as a power source for electrically driven power steering in a motor vehicle or the like, since the rapid torque variation of a motor is reducible, the steering feel of the steering wheel is improvable and the vibration noise is reducible.

Additionally, the present invention is also applicable to the control of a ball screw type electrically driven power steering tubular shaft brushless motor, and is not limited to brushless motors, but is applicable to the control of motors (for example, linear motors) to be drive-controlled by rectangular waves.

What is claimed is:

1. A brushless DC motor drive control system for controlling a rate of change of current for commutation phases to prevent variation of a sum of currents of said commutation phases in excitation coils of a brushless DC motor, said system comprising current supply means for supplying a drive current according to a pulse width modulation, a time period or energizing period for which said drive current is supplied to an OFF-phase in said excitation coils, wherein said current supply means is limited to eliminate a residual current for said OFF-phase of said commutation phases in said excitation coils.

2. A brushless DC motor drive control system according to claim 1, wherein said energizing period to said OFF phase is made to come to an end when a current for said OFF phase reaches zero.

3. A brushless DC motor drive control system according to claim 2, wherein the time period to be taken from when a commutation begins until said OFF-phase current reaches zero is determined on the basis of an electrical time constant and resistance value of an equivalent circuit in said OFF-phase, a PWM duty ratio to be applied to said OFF-phase at the commutation, a motor reverse electromotive voltage of said brushless DC motor, a DC line voltage being a power supply voltage for a circuit for said pulse width modulation and an initial current value at the commutation.

4. A motor drive control system for controlling a drive of a motor having a plurality of excitation phases, the system comprising drive means for producing an exciting signal to be supplied to each of said excitation phases of said motor and control means for determining a direction of said exciting signal for each of said excitation phases and for conducting a commutation operation, wherein said drive means includes a drive circuit for generating an excitation current to be supplied to a plurality of excitation coils of said motor, wherein said control means produces a drive signal by conducting a composite operation of a first PWM signal for an excitation phase in which said excitation current is not commutated and a second PWM signal for an excitation phase where said excitation current rises and/or falls and wherein said control means further supplies said drive signal to said drive circuit to make rates of change of currents for an excitation phase where said excitation current rises and an excitation phase where said excitation current falls coincide with each other at commutation of said excitation current or to cause said rates of change to be substantially equal to each other.

5. A motor drive control system according to claim 4, wherein a duty ratio (Duty2) of said second PWM signal is a function of a motor current value at said commutation operation, a duty ratio (Duty1) of said first PWM signal, a rotational angular velocity ($\omega$) of said motor, a reverse electromotive voltage constant (Km) of said motor, a power supply voltage (Vb) to be supplied to said motor drive circuit and a resistance component (R) of an equivalent electric circuit of said motor and said drive circuit.

6. A motor drive control system for controlling a drive of a motor having a plurality of excitation phases, said system comprising drive means for producing an exciting signal to be supplied to each of said excitation phases of said motor and control means for determining a direction of said exciting signal for each of said excitation phases and for conducting a commutation operation, wherein said motor is a five-phase brushless motor and said five-phase brushless motor is driven by an FET array, said drive means employs a four-phase exciting method of successively switching exciting coils to be energized by phases while energizing four phases simultaneously, and said control means being made to control a rate of change of current for commutation phases at said commutation operation and is composed of a current control section, a PWM duty ratio operating section for an excitation phase where said excitation current rises or falls, a motor rotational speed operating section and an FET gate drive signal operating section.

7. A motor drive control system according to claim 6, wherein a rate of change of current for a falling phase is controlled at commutation operation of said excitation current to be coincident with a rate of change of current of a PWM signal for a rising phase.

8. A motor drive control system according to claim 6, wherein a rate of change of current for a rising phase is controlled at commutation operation of said excitation current to be coincident with a rate of change of current of a PWM signal for a falling phase.

9. A motor drive control system according to claim 6, wherein a range of change of current of a PWM signal for a rising phase and a rate of change of current of a PWM signal for a falling phase are controlled at commutation operation of said excitation current to be coincident with each other.

10. A motor drive control system for controlling a drive of a motor having a plurality of excitation phases without using two or more current detecting circuits for detecting an excitation current in said motor, said system comprising drive means for producing an excitation signal to be supplied to each of said excitation phases of said motor and control means for determining a direction of said excitation signal for each of said excitation phases and for conducting a commutation operation, wherein said control means producing said excitation signal to maintain a sum of said excitation current for said excitation phases of said motor constant at said commutation operation and controls a rate of change of said excitation current to be commutated at said commutation operation, and said drive means includes a drive circuit for generating said excitation current to be supplied as said excitation signal to a plurality of excitation coils of said motor, further said control means produces a drive signal by conducting a composite operation of a first PWM signal for an upper side (forward current) and a third PWM signal for an lower side (reverse direction current) for said excitation phases where said excitation current is not commutated and a second PWM signal for said upper side (forward current) and a fourth PWM signal for the lower side (reverse direction current) for said excitation phases where said excitation current rises and/or for said excitation phases where said excitation current falls, and wherein said control means further supplies said drive signal to said drive circuit to make rates of change of currents for an excitation phase where said excitation current rises and an excitation phase where said excitation current falls coincide with each other at said commutation operation of said excitation current or to cause said rates of change to be substantially equal to each other.

11. A motor drive control system according to claim 10, wherein duty ratios of said second PWM signal and said third PWM signal are functions of a motor current at the communication operation, duty ratios of said first PWM signal and said third PWM signal, a rotational angular velocity of said motor, a power supply voltage to be supplied to said motor drive circuit and a resistance component of an equivalent electric circuit of said motor and said drive circuit.

* * * * *